(12) United States Patent
Wang et al.

(10) Patent No.: US 11,927,711 B2
(45) Date of Patent: Mar. 12, 2024

(54) ENHANCED-RESOLUTION SONIC DATA PROCESSING FOR FORMATION BODY WAVE SLOWNESS WITH FULL OFFSET WAVEFORM DATA

(71) Applicant: HALLIBURTON ENERGY SERVICES, INC., Houston, TX (US)

(72) Inventors: Ruijia Wang, Singapore (SG); Baichun Sun, Perth (AU)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 267 days.

(21) Appl. No.: 17/601,990

(22) PCT Filed: May 21, 2019

(86) PCT No.: PCT/US2019/033210
§ 371 (c)(1),
(2) Date: Oct. 7, 2021

(87) PCT Pub. No.: WO2020/236153
PCT Pub. Date: Nov. 26, 2020

(65) Prior Publication Data
US 2022/0179118 A1 Jun. 9, 2022

(51) Int. Cl.
*G01V 1/50* (2006.01)
*E21B 49/00* (2006.01)
(Continued)

(52) U.S. Cl.
CPC .............. *G01V 1/50* (2013.01); *E21B 49/00* (2013.01); *G01V 1/46* (2013.01); *G01V 1/52* (2013.01);
(Continued)

(58) Field of Classification Search
CPC ....... E21B 49/00; E21B 2200/20; G01V 1/46; G01V 2210/1299; G01V 2210/1429;
(Continued)

(56) References Cited

U.S. PATENT DOCUMENTS 6,477,112 B1 11/2002 Tang et al.
2003/0002388 A1* 1/2003 Mandal .................... G01V 1/44
367/25

(Continued)

FOREIGN PATENT DOCUMENTS

CA 2888529 A1 5/2014
EP 2914981 A4 11/2015
(Continued)

OTHER PUBLICATIONS

International Search Report and Written Opinion, PCT Application No. PCT/US2019/033210, dated Feb. 20, 2020, 9 pages.
(Continued)

*Primary Examiner* — Regis J Betsch
(74) *Attorney, Agent, or Firm* — NOVAK DRUCE CARROLL LLP

(57) ABSTRACT

Apparatus, methods, and systems for determining body wave slowness values for a target formation zone. A method includes selecting a target axial resolution based on the size of a receiver array, obtaining a plurality of waveform data sets corresponding to a target formation zone and each acquired at a different shot position, reconstructing the plurality of waveform data sets to generate a plurality of subarray data sets corresponding to the target formation zone, determining a slowness value for each subarray data set and determining a slowness versus offset value for each subarray data set. The method may also include generating a borehole model having at least one alteration formation zone and a virgin formation zone and generating a slowness
(Continued)

versus offset model based at least in part on the borehole model. The method may also include determining a radial depth of the alteration formation zone.

18 Claims, 15 Drawing Sheets

(51) Int. Cl.
 *G01V 1/46* (2006.01)
 *G01V 1/52* (2006.01)
(52) U.S. Cl.
 CPC .. *E21B 2200/20* (2020.05); *G01V 2210/1299* (2013.01); *G01V 2210/1429* (2013.01); *G01V 2210/324* (2013.01); *G01V 2210/47* (2013.01); *G01V 2210/614* (2013.01); *G01V 2210/6222* (2013.01); *G01V 2210/66* (2013.01)
(58) Field of Classification Search
 CPC ......... G01V 2210/324; G01V 2210/47; G01V 2210/614; G01V 2210/6222; G01V 2210/66
 See application file for complete search history.

(56) References Cited

U.S. PATENT DOCUMENTS

| | | | |
|---|---|---|---|
| 2012/0026831 A1* | 2/2012 | Mickael | G01V 1/52 367/75 |
| 2015/0198032 A1 | 7/2015 | Sinha et al. | |
| 2015/0253447 A1 | 9/2015 | Mukhopadhyay et al. | |
| 2016/0187513 A1* | 6/2016 | Poole | G01V 1/362 702/16 |
| 2019/0018161 A1 | 1/2019 | Wang et al. | |

FOREIGN PATENT DOCUMENTS

| | | | |
|---|---|---|---|
| WO | 2014070182 A1 | 5/2014 | |
| WO | 2018080450 A1 | 5/2018 | |
| WO | WO-2018080450 A1 * | 5/2018 | ............ E21B 49/00 |
| WO | 2018231234 A1 | 12/2018 | |

OTHER PUBLICATIONS

Kimball, Christopher V., et al. "Semblance Processing of Borehole Acoustic Array Data", Geophysics vol. 49 No. 3, Mar. 1984, pp. 274-281.

Abstract of Tang, Xiao-Ming, et al. "Quantitative Borehole Acoustic Methods", vol. 24. Gulf Professional Publishing, Feb. 10, 2004; Downloaded Oct. 6, 2021.

Ruijia Wang, et al. "Advanced Real-Time Sonic Logging Data Processing", SEG Technical Program Expanded Abstracts 2016, Sep. 2016, pp. 647-651.

Shan Huang, et al. "Inversion-Based Interpretation of Borehole Sonic Measurements Using Semianalytical Spatial Sensitivity Functions", Geophysics, vol. 81 Issue 2, Mar. 2016, D111-D124.

Shan Huang, et al. "Fast-Forward Modeling of Compressional Arrival Slowness Logs in High-Angle and Horizontal Wells", Geophysics, vol. 82 Issue 2, Mar. 2017, D107-D122.

* cited by examiner

ENHANCED-RESOLUTION SONIC DATA PROCESSING FOR FORMATION BODY WAVE SLOWNESS WITH FULL OFFSET WAVEFORM DATA

CROSS-REFERENCE TO RELATED APPLICATIONS

This application is a national stage entry of PCT/US2019/033210 filed May 21, 2019, said application is expressly incorporated herein by reference in its entirety.

FIELD

The present disclosure relates to improved sonic logging methods in subterranean wellbores. In particular, the present disclosure relates to devices, methods, and systems, for improved slowness log resolution and accuracy using borehole refracted compressional and shear waves.

BACKGROUND

Wellbores are drilled into the earth for a variety of purposes including tapping into hydrocarbon bearing formations to extract the hydrocarbons for use as fuel, lubricants, chemical production, and other purposes. In order to facilitate processes and operations in the wellbore, various tools may be conveyed downhole. For example, sonic logging tools may be lowered into the wellbore in order to facilitate petrophysical interpretation and petroleum engineering analysis. Sonic logging provides various properties of the rock formation and borehole fluid, including, for example, the formation compressional and shear wave slowness, formation permeability, formation shear slowness anisotropy and borehole mud slowness.

Compressional wave logging provides fundamental dynamic elastic properties of the formation, and thus is the most important and primary task in sonic logging. Compressional wave logging often employs a long-spaced large-span acoustic receiver array and a corresponding large-span array processing algorithm. Since the noise and near-borehole-waves are suppressed by such a receiver system, the configuration tends to provide smooth and stable compressional slowness logs. However, large-span array processing often sacrifices axial resolution of the compressional log in order to decrease the noise in the data. As a result, laminated formations with thin beds may not be identified and correctly evaluated with such low-resolution logs. Additionally, near-wellbore portions of the formations may be invaded by drilling fluids, cuttings, treatment fluids, and the like, thereby creating a zone of alteration in the formation. While the long spaced receiver system may be adapted to obtain compressional wave slowness from the virgin formation and to minimize formation alteration effects, suitable source-receiver spacings are different for altered formations having different invasion depths. Therefore, a fixed receiver array having a fixed source-receiver spacing configuration is not suited to every formation and may not provide true compressional wave slowness of a virgin formation. Furthermore, waves associated with a zone of alteration may comprise useful information relevant to analyzing borehole stability and safe mud window. Accordingly, sonic logging methods capable of providing compressional logs having enhanced resolution and/or accuracy are desirable. Additionally, sonic logging methods capable of capturing and analyzing waves associated with zones of alteration are desirable.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
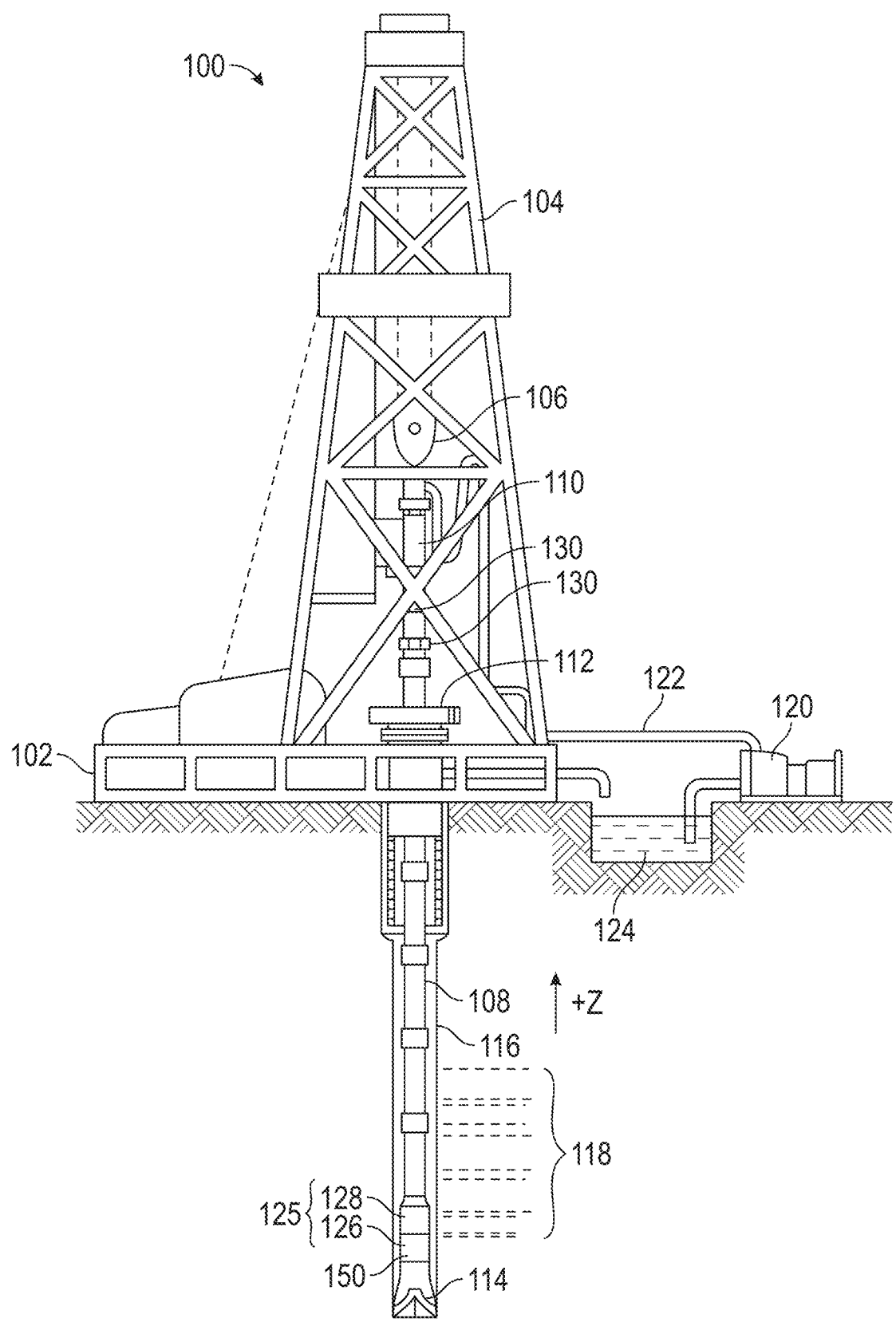
FIG. 1 is a diagram of a logging while drilling (LWD) or measurement while drilling (MWD) wellbore operating environment in which the presently disclosed apparatus, method, and system may be deployed, according to an exemplary embodiment of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and also may include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "uphole" meaning toward the surface of the wellbore and with "down," "lower," "downward," "downstream," or "downhole" meaning toward the terminal end of the well, regardless of the wellbore orientation. The various characteristics described in more detail below, will be readily apparent to those skilled in the art with the aid of this disclosure upon reading the following detailed description, and by referring to the accompanying drawings.

The present disclosure provides methods for extracting high-resolution compressional/shear logs for both the invaded zone of a formation and virgin formations from full-spaced waveforms with multi-shot firing that uses global inversion processing employing a simplified formation-invasion model. The presently disclosed methods provide compressional/shear wave slowness logs having improved resolution and enhanced accuracy over conventional methods. Additionally, the presently disclosed methods can be performed in real-time, thereby providing real-time high-resolution virgin formation slowness, alteration zone slowness, and alteration zone radial depths (invasion radial depths). The presently disclosed methods may also be used in post-processing to provide formation body wave slowness with enhanced resolution and accuracy. According to at least one aspect of the present disclosure, the disclosed methods are constrained by a simplified borehole model with alteration, providing for more stability than conventional methods.

According to an aspect of the present disclosure, a method of determining body wave slowness values for a target formation zone is provided. The method may include selecting a target axial resolution based on the size of a receiver array and obtaining a plurality of waveform data sets corresponding to a target formation zone, wherein each waveform data set is acquired at a different shot position. In at least some instances, the plurality of waveform data sets comprises lower monopole (LMP), far monopole (FMP), and ultrafar monopole (UFMP) data. The method may further include reconstructing the plurality of waveform data sets to generate a plurality of subarray data sets corresponding to the target formation zone. The method may also include determining a slowness value and a slowness versus offset value for each subarray data set.

The method may also include generating a borehole model having an alteration formation zone and a virgin formation zone as well as generating a slowness versus offset model based at least in part on the borehole model. In at least some instances, the slowness versus offset model may be generated using forward modeling. In other instances, generating the slowness versus offset model may include generating a look-up table comprising slowness values and related offset values. The look-up table may be generated using forward modeling.

The method may further include optimizing the parameters in the borehole model by minimizing the misfit between the slowness value for each subarray data set and the borehole model and the slowness versus offset model to generate an optimized borehole model and an optimized slowness versus offset model. In at least some instances, optimizing the parameters in the borehole model includes generating, using forward modeling, a look-up table that includes optimized slowness versus offset values. Further, the method may include extracting a virgin formation zone slowness from the optimized slowness versus offset model based on the slowness with the longest offset predicted by the model and extracting an alteration formation zone slowness from the optimized slowness versus offset model based on the slowness with the shortest offset predicted by the model.

In at least some instances, the method may also include determining the radial depth of the alteration formation zone based on the optimized slowness versus offset model. For instance, the radial depth of the alteration formation zone may be determined by calculating based on the optimized slowness versus offset model using a ray-model.

The aspects of the method may be performed using one or more processors or one or more computing devices. The one or more processors or one or more computing devices may be located on the surface or in the wellbore. In at least some instances, the one or more processors or one or more computing devices may be included in the acoustic logging tool.

According to one aspect, the method may further include disposing an acoustic logging tool in a wellbore. The acoustic logging tool may include one or more transmitters and a receiver array comprising a plurality of receivers. The method may further include actuating the one or more transmitters so as to obtain a plurality of waveform data sets corresponding to the target formation zone. According to another aspect, the method may further include running the acoustic logging tool to a plurality of shot positions in the wellbore and actuating the one or more transmitters at each of the plurality of shot positions so as to obtain a plurality of waveform data sets at the receiver array corresponding to the target formation zone, where each waveform data set is acquired at a different shot position.

According to at least one aspect of the present disclosure, a method of determining body wave slowness values for a target formation zone is provided. The method includes selecting a target axial resolution based on the size of the receiver array and obtaining a plurality of waveform data sets corresponding to a target formation zone, wherein each waveform data set is acquired at a different shot position. In at least some instances, the plurality of waveform data sets comprises lower monopole (LMP), far monopole (FMP), and ultrafar monopole (UFMP) data. The method may also include determining reconstructed sets of waveform data for the target formation zone, wherein each reconstructed set of waveform data corresponds to a particular shot position. The method may also include determining a semblance map, a variable density log (VDL), and a slowness value for each reconstructed set of waveform data. Further, the method may include stacking the VDLs and extracting body wave slowness values from the stacked VDLs.

According to an aspect of the present disclosure, an apparatus is provided. The apparatus may include an acoustic logging tool having a receiver array. The acoustic logging tool may be configured to acquire a plurality of waveform data sets corresponding to a target formation zone, wherein each waveform data set is acquired at a different shot position. The acoustic logging tool may also be configured to acquire lower monopole (LMP), far monopole (FMP), and ultrafar monopole (UFMP) data. The apparatus may further include at least one processor in communication with the acoustic logging tool, wherein the processor is coupled with a non-transitory computer-readable storage medium having stored instructions which, when executed by the at least one processor, causes the at least one processor to: select a target axial resolution based on the size of a receiver array and obtain a plurality of waveform data sets corresponding to a target formation zone, wherein each waveform data set is acquired at a different shot position. In at least some instances, the at least one processor may be disposed in the acoustic logging tool. In other instances, the at least one processor may be located on the surface. In still other cases, the at least one processor may be a plurality of processors that are located both in the wellbore, for example, as part of the acoustic logging tool, and on the surface.

The non-transitory computer-readable storage medium may further contain instructions that when executed by the processor, further causes the processor to reconstruct the plurality of waveform data sets to generate a plurality of subarray data sets corresponding to the target formation zone. The non-transitory computer-readable storage medium may further contain instructions causing the processor to determine a slowness value and a slowness versus offset value for each subarray data set. The non-transitory computer-readable storage medium may further contain instructions causing the processor to generate a borehole model having an alteration formation zone and a virgin formation zone and generate a slowness versus offset model based at least in part on the borehole model.

The non-transitory computer-readable storage medium may further contain instructions causing the processor to optimize the parameters in the borehole model by minimizing the misfit between the slowness value for each subarray data set and the borehole model and the slowness versus offset model to generate an optimized borehole model and an optimized slowness versus offset model. The non-transitory computer-readable storage medium may further contain instructions causing the processor to extract a virgin formation zone slowness from the optimized slowness versus offset model based on the slowness with the longest offset predicted by the model and to extract an alteration formation zone slowness from the optimized slowness versus offset model based on the slowness with the shortest offset predicted by the model.

The non-transitory computer-readable storage medium may further contain instructions causing the processor to determine the radial depth of the alteration formation zone based on the optimized slowness versus offset model. In some instances, the radial depth of the alteration formation zone may be determined by calculating based on the optimized slowness versus offset model using a ray-model.

According to an aspect of the present disclosure, a system is provided. The system may include an acoustic logging tool disposed within a wellbore. The acoustic logging tool may have a receiver array and be configured to acquire a plurality of waveform data sets corresponding to a target formation zone, wherein each waveform data set is acquired at a different shot position. The acoustic logging tool may also be configured to acquire lower monopole (LMP), far monopole (FMP), and ultrafar monopole (UFMP) data. The system may further include at least one processor in communication with the acoustic logging tool. The processor may be coupled with a non-transitory computer-readable storage medium having stored therein instructions which, when executed by the at least one processor, causes the at least one processor to: select a target axial resolution based on the size of a receiver array and obtain a plurality of waveform data sets corresponding to a target formation zone, wherein each waveform data set is acquired at a different shot position. The non-transitory computer-readable storage medium may further contain instructions causing the processor to reconstruct the plurality of waveform data sets to generate a plurality of subarray data sets corresponding to the target formation zone. The non-transitory computer-readable storage medium may further contain instructions causing the processor to determine a slowness value and a slowness versus offset value for each subarray data set.

The non-transitory computer-readable storage medium may further contain instructions causing the processor to generate a borehole model having an alteration formation zone and a virgin formation zone and generate a slowness versus offset model based at least in part on the borehole model. The non-transitory computer-readable storage medium may further contain instructions causing the processor to optimize the parameters in the borehole model by minimizing the misfit between the slowness value for each subarray data set and the borehole model and the slowness versus offset model to generate an optimized borehole model and an optimized slowness versus offset model. The non-transitory computer-readable storage medium may further contain instructions causing the processor to extract a virgin formation zone slowness from the optimized slowness versus offset model based on the slowness with the longest offset predicted by the model and extract an alteration formation zone slowness from the optimized slowness versus offset model based on the slowness with the shortest offset predicted by the model. The non-transitory computer-readable storage medium may further contain instructions causing the processor to determine the radial depth of the alteration formation zone based on the optimized slowness versus offset model using a ray-model.

FIG. 1 illustrates a diagrammatic view of a logging while drilling (LWD) or measurement while drilling (MWD) wellbore operating environment 100 in which the presently disclosed apparatus, method, and system, may be deployed in accordance with certain exemplary embodiments of the present disclosure. As depicted in FIG. 1, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In at least some cases, the telemetry sub 128 communicates with a surface receiver 130 using mud pulse telemetry. In at least some embodiments, the telemetry sub 128 does not communicate with the surface, but rather stores logging data for later retrieval at the surface when the logging assembly is recovered.

Each of the logging tools 126 may include a plurality of tool components, spaced apart from each other, and communicatively coupled with one or more wires. Logging tools 126 may include apparatus such as that shown in FIGS. 6-8 such as to perform acoustic (i.e., "sonic") logging. The telemetry sub 128 may include wireless telemetry or logging capabilities, or both, such as to transmit or later provide information indicative of received acoustic energy to operators on the surface or for later access and data processing for the evaluation of formation 118 properties.

The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the methods of the present disclosure.

In at least some instances, one or more of the logging tools 126 may communicate with a surface receiver 130, such as wired drillpipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device 150 on the surface. In some cases, the computing device 150 may be included in surface receiver 130. For example, surface receiver 130 of LWD or MWD wellbore operating environment 100 at the surface may include one or more of wireless telemetry, processor circuitry, or memory facilities, such as to support logging-while-drilling (LWD) or measurement-while-drilling (MWD) operations.

Figure 2:
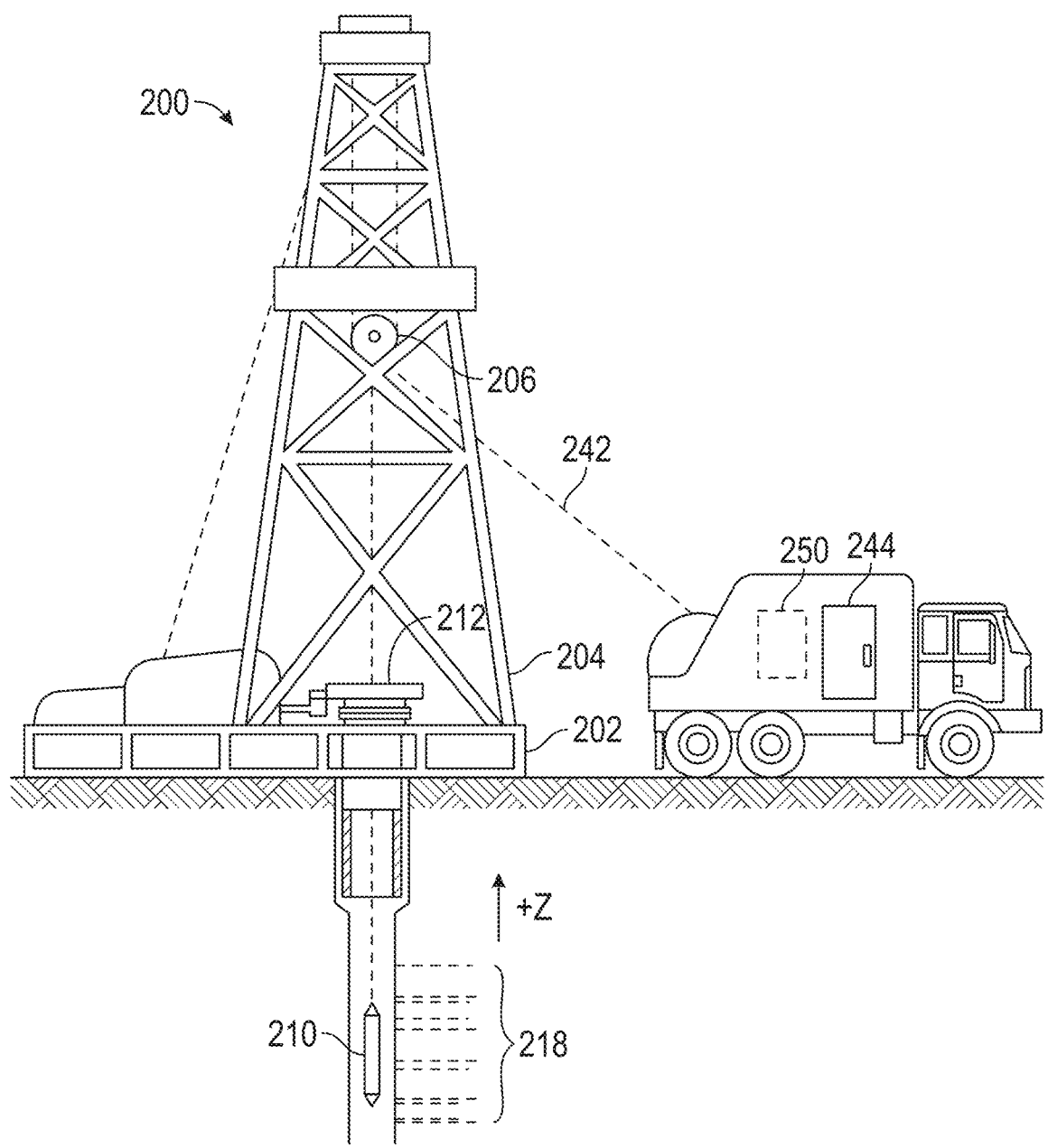
FIG. 2 illustrates a diagrammatic view of a conveyance logging wellbore operating environment in which the presently disclosed apparatus, method, and system, may be deployed, according to an exemplary embodiment of the present disclosure.
Figure 6:
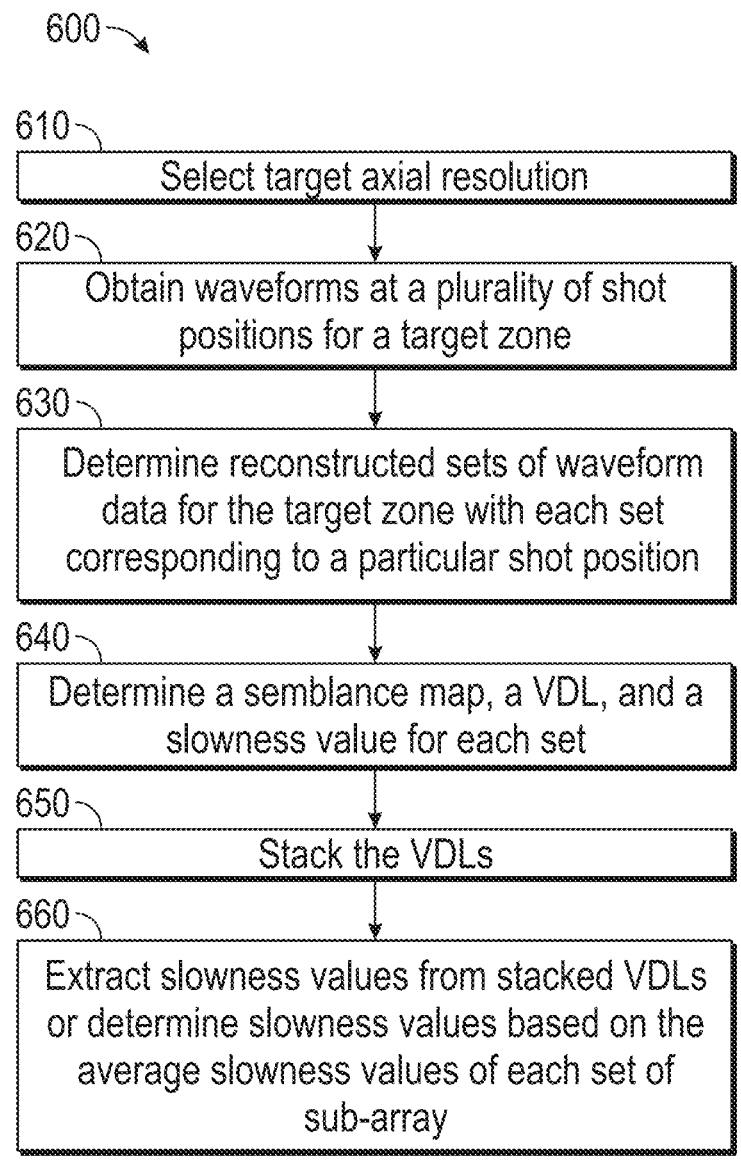
FIG. 6 illustrates a diagrammatic view of an acoustic logging tool lowered in a wellbore to collect waveforms from a target zone at a plurality of shot positions, according to an exemplary embodiment of the present disclosure.
Figure 7:
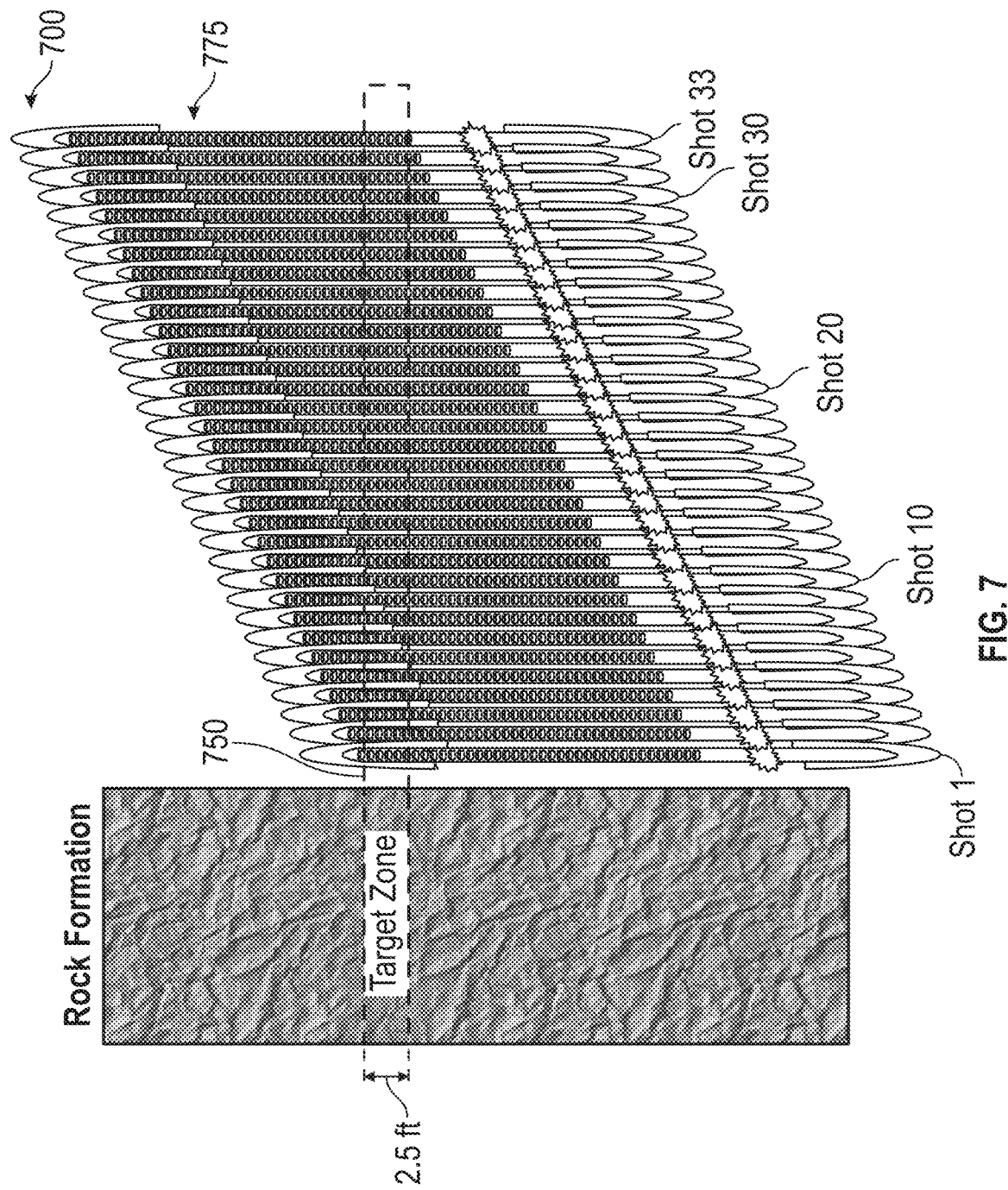
FIG. 7 illustrates a flowchart depicting a method of enhanced resolution formation wave slowness using a stacking technique to enhance the signal to noise ratio and to utilize all data, according to an exemplary embodiment of the present disclosure.
Figure 8:
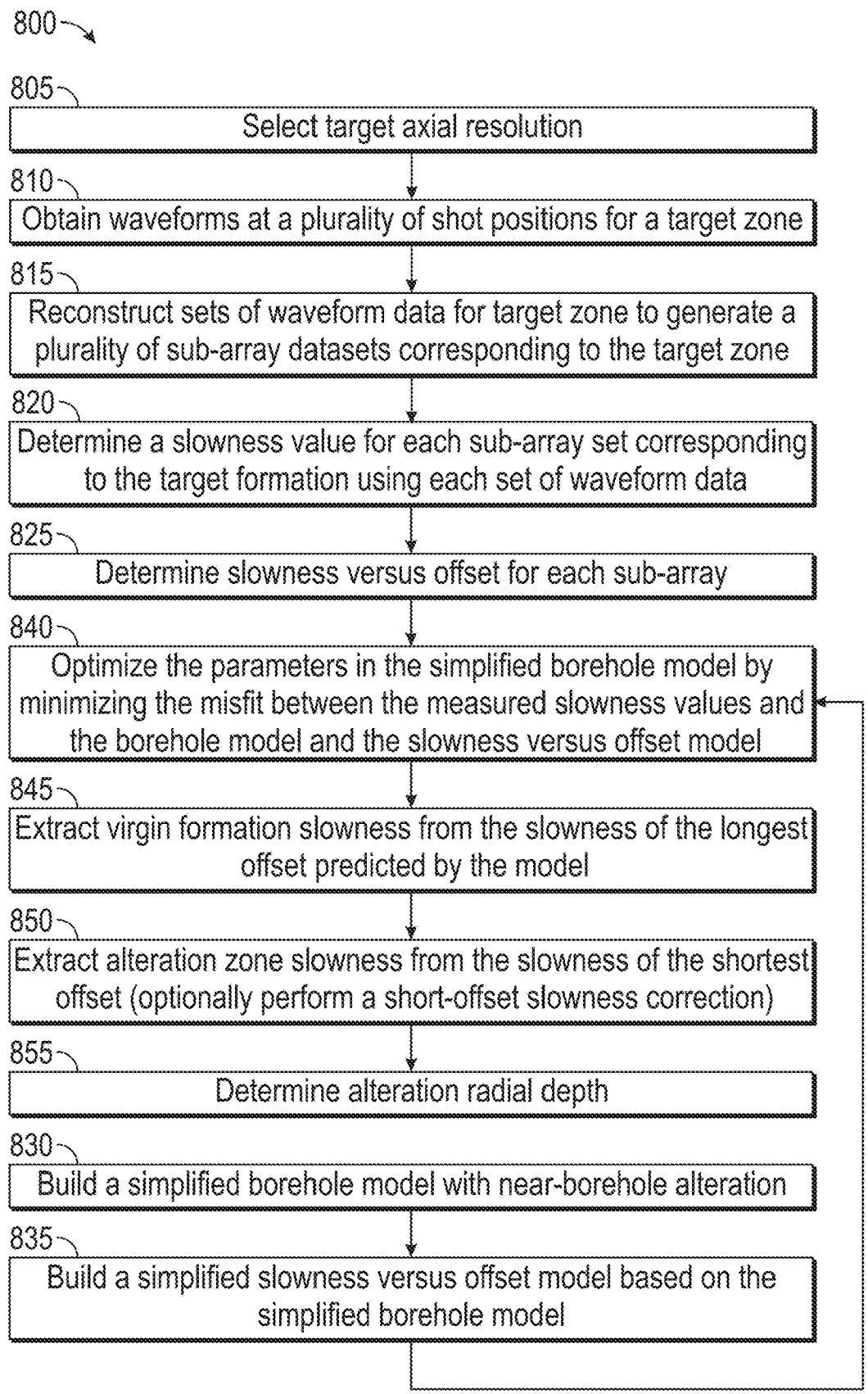
FIG. 8 illustrates a flowchart depicting a method of enhanced resolution formation wave slowness using a model-constrained sub-array processing technique to utilize full data sets, according to an exemplary embodiment of the present disclosure.

FIG. 2 illustrates a diagrammatic view of a conveyance logging wellbore operating environment 200 in which the presently disclosed apparatus, method, and system, may be deployed in accordance with certain exemplary embodiments of the present disclosure. As depicted in FIG. 2, a hoist 206 may be included as a portion of a platform 202, such as that coupled to derrick 204, and used to raise or lower equipment such as acoustic logging tool 210 into or out of a borehole via conveyance 242 coupled with acoustic logging tool 210. Acoustic logging tool 210 may include, for example, such apparatus as shown in FIGS. 6-8.

Conveyance 242 may in some instances provide a communicative coupling between the acoustic logging tool 210 and a logging facility 244 at the surface. The conveyance 242 may be, for example, a mechanical lift, a pipe (e.g., drill pipe), and/or a downhole tractor. Examples of mechanical lift conveyances that may be used include one or more wires, wireline, slickline, coiled tubing, joint tubing, and other tubulars. In some instances, the conveyance 242 may provide power and communication to the acoustic logging tool 210. In other instances, the conveyance 242 may provide only power to the acoustic logging tool 210 or the conveyance may provide only communication to the acoustic logging tool 210. In still other cases, the conveyance 242 may provide neither power nor communication to the acoustic logging tool 210. In such cases, the acoustic logging tool 210 may operate on a remote power source and store data in memory that is read later once the acoustic logging tool 210 is brought to the surface.

The logging facility 244 may include a computing device 250 capable of carrying out the methods and techniques of the present disclosure. In this manner, information about the formation 218 may be obtained by acoustic logging tool 210 and processed by a computing device, such as computing device 250. All or a portion of the information about formation 218 may also be processed by a computing device within acoustic logging tool 210 or by another computer device disposed within the wellbore, such as computing device 150.

Figure 3A:
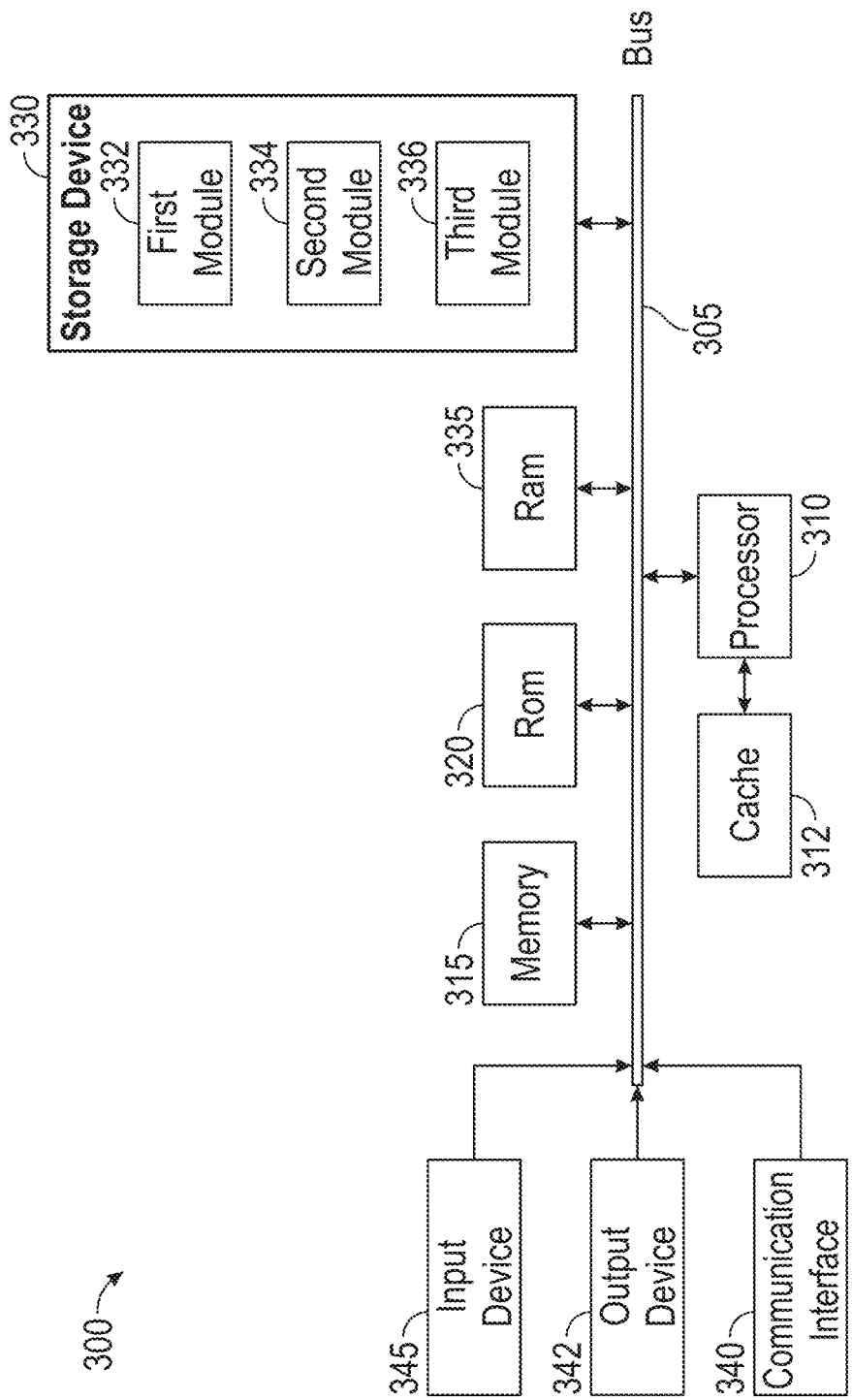
FIG. 3A is an illustration depicting a conventional system bus computing system architecture, according to an exemplary embodiment of the present disclosure.
Figure 3B:
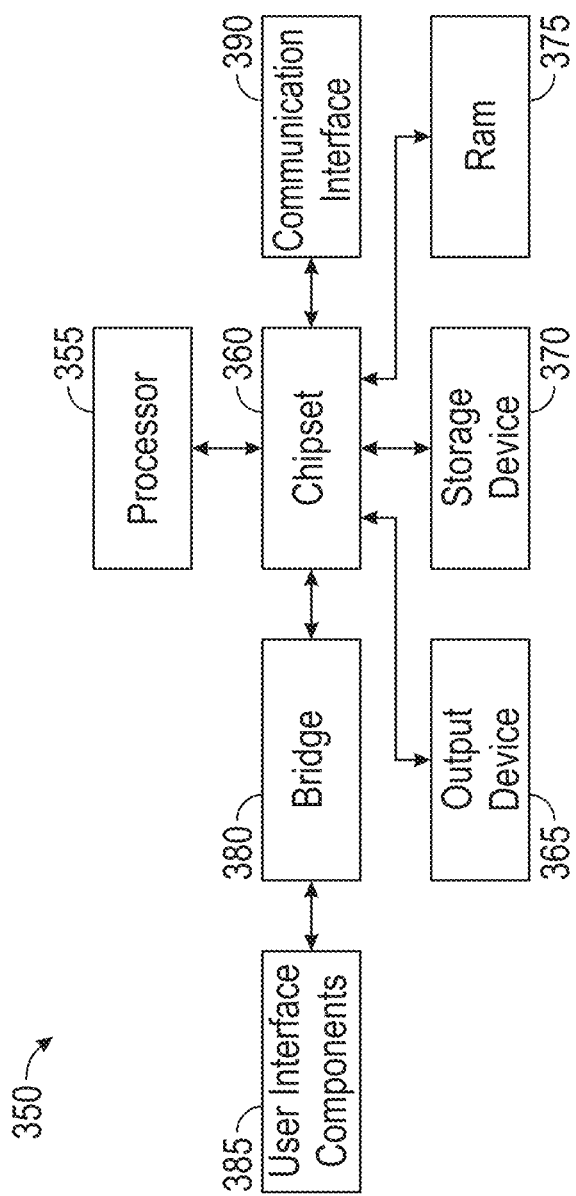
FIG. 3B is an illustration depicting a computer system having a chipset architecture, according to an exemplary embodiment of the present disclosure.

Computing devices, such as computing devices 150, 250 and any computing devices disposed within the wellbore or within the acoustic logging tool 210, may include any suitable computer, controller, or data processing apparatus capable of being programmed to carry out the method, system, and apparatus as further described herein. FIGS. 3A and 3B illustrate exemplary computing device embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 305. System 300 can include a processing unit (CPU or processor) 310 and a system bus 305 that couples various system components including the system memory 315, such as read only memory (ROM) 320 and random access memory (RAM) 335, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache 312 can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. It can be appreciated that the disclosure may operate on a computing device 300 with more than one processor 310 or on a group or cluster of computing devices networked together to provide greater processing capability. The processor 310 can include any general purpose processor and a hardware module or software module, such as first module 332, second module 334, and third module 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

The system bus 305 may be any of several types of bus structures including a memory bus or a memory controller, a peripheral bus, and a local bus using any of a variety of bus architectures. A basic input/output (BIOS) stored in ROM 320 or the like, may provide the basic routine that helps to transfer information between elements within the computing device 300, such as during start-up. The computing device 300 further includes storage devices 330 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 330 can include software modules 332, 334, 336 for controlling the processor 310. The system 300 can include other hardware or software modules. The storage device 330 is connected to the system bus 305 by a drive interface. The drives and the associated computer-readable storage devices provide non-volatile storage of computer-readable instructions, data structures, program modules and other data for the computing device 300. In one aspect, a hardware module that performs a particular function includes the software components shorted in a tangible computer-readable storage device in connection with the necessary hardware components, such as the processor 310, bus 305, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 310 executes instructions to perform "operations", the processor 310 can perform the operations directly and/or facilitate, direct, or cooperate with another device or component to perform the operations.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 342 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks (DVDs), cartridges, RAMS 325, ROM 320, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 300 shown in FIG. 3A can practice all or part of the recited methods, can be a part of the recited systems, and/or can operate according to instructions in the recited tangible computer-readable storage devices.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 310 can include all types of processors disclosed herein, including a virtual processor. However, when referring to a virtual processor, the processor 310 includes the software components associated with executing the virtual processor in a virtualization layer and underlying hardware necessary to execute the virtualization layer. The system 300 can include a physical or virtual processor 310 that receives instructions stored in a computer-readable storage device, which causes the processor 310 to perform certain operations. When referring to a virtual processor 310, the system also includes the underlying physical hardware executing the virtual processor 310.

FIG. 3B illustrates an example computer system 350 having a chipset architecture that can be used in executing the described method and generating and displaying a graphical user interface (GUI). Computer system 350 can be computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. Chipset 360 can output information to output device 365, such as a display, and can read and write information to storage device 370, which can include magnetic media, and solid state media. Chipset 360 can also read data from and write data to RAM 375. A bridge 380 for interfacing with a variety of user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks.

Some applications of the methods for generating, displaying, and using the GUI disclosed herein can include receiving ordered datasets over the physical interface or be generated by the machine itself by processor 355 analyzing data stored in storage 370 or RAM 375. Further, the machine can receive inputs from a user via user interface components 385 and execute appropriate functions, such as browsing functions by interpreting these inputs using processor 355.

It can be appreciated that systems 300 and 350 can have more than one processor 310, 355 or be part of a group or cluster of computing devices networked together to provide processing capability. For example, the processor 310, 355 can include multiple processors, such as a system having multiple, physically separate processors in different sockets, or a system having multiple processor cores on a single physical chip. Similarly, the processor 310 can include multiple distributed processors located in multiple separate computing devices, but working together such as via a communications network. Multiple processors or processor cores can share resources such as memory 315 or the cache 312, or can operate using independent resources. The processor 310 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 310, that is purpose-built to operate as an equivalent to software executing on a general purpose processor. For example, the functions of one or more processors represented in FIG. 3A may be provided by a single shared processor or multiple processors. (use of the term "processor" should not be construed to refer exclusively to hardware capable of executing software.) Illustrative embodiments may include microprocessor and/or digital signal processor (DSP) hardware, ROM 320 for storing software performing the operations described below, and RAM 335 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include the acoustic logging tool itself, as well as laptops, smart phones, small form factor personal computers, personal digital assistants, rackmount devices, stand-alone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in the present disclosure.

Figure 4:
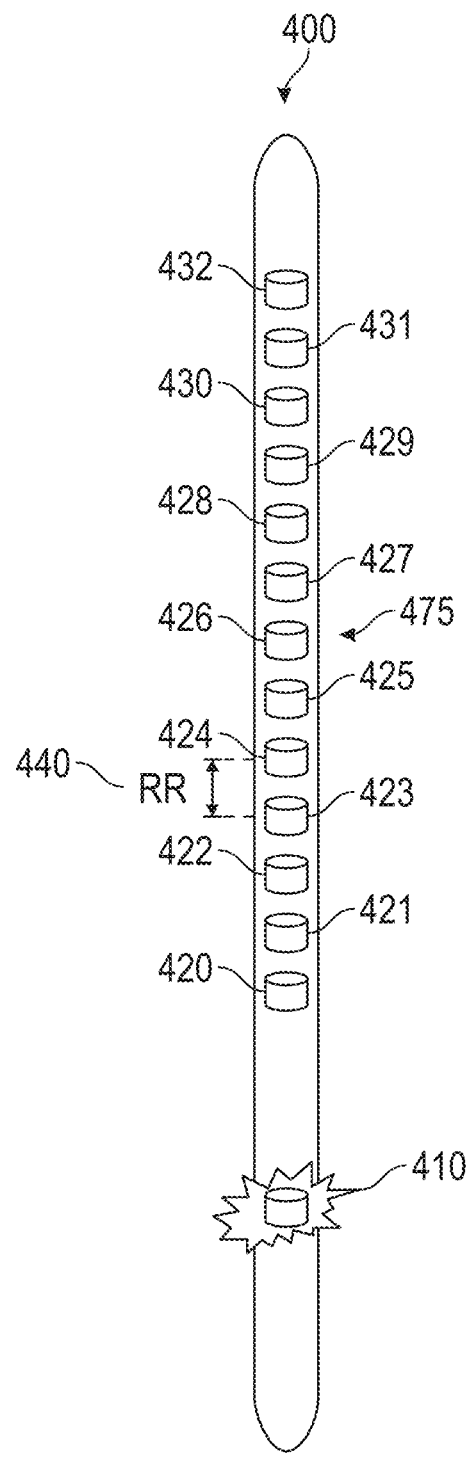
FIG. 4 illustrates a diagrammatic view of an acoustic logging tool capable of performing the presently disclosed methods and techniques, according to an exemplary embodiment of the present disclosure.

FIG. 4 depicts a simplified acoustic logging tool 400 capable of performing the presently disclosed methods and techniques in accordance with certain exemplary embodiments of the present disclosure. Compressional wave logging tools may include large-span receiver arrays in order to enhance the quality of data by achieving better signal to noise ratio. However, the use of larger-span receiver arrays also compromises the axial resolution of the acquired slowness logs. In particular, the use of large-span receiver arrays does not work well with respect to thin beds or formations with strong heterogeneity, as in such circumstances, the low-resolution data may lose correlation to the small geological constituents and structure, and the slowness logs may be biased toward nearby formations. In such cases, sub-array processing according to the present disclosed methods may be used.

As depicted in FIG. 4, the acoustic logging tool 400 includes at least one transmitter 410 capable of exciting acoustic signals of different azimuthal orders. Acoustic logging tool 400 may include any number of transmitters capable of exciting acoustic signals. Acoustic logging tool 400 further includes a receiver array 475. The receiver array 475 may have any number of receivers. For example, receiver array 475 may include 4 receivers or 50 receivers, or any number of receivers therebetween. The receivers in the receiver array 475 may also have any receiver to receiver spacing. For example, the receiver to receiver spacing in receiver array 475 may be from about 0.01 feet (0.015 meters) to about 5 feet (1.5 meters).

As depicted in FIG. 4, acoustic logging tool 400 includes a large-span receiver array 475 comprising thirteen receivers 420-432 with a spacing 440 of 0.5 feet (0.152 meters). As described above, the acoustic logging tool 400 may include any number of transmitters and receiver arrays, having any number of receivers and receiver-receiver spacings, and still be within the spirit and scope of the present disclosure. While FIG. 4 depicts an acoustic logging tool having one transmitter and thirteen receivers, acoustic logging tool 400 may include any number of transmitters and receivers. For example, acoustic logging tool 400 may include an array of five receivers, or ten receivers, or 15 receivers, or 25 receivers, or 39 receivers, and any number of receivers therebetween. The exemplary depicted large-span receiver array in FIG. 4 is capable of capturing an acoustic wave field of different azimuthal orders. In such an acoustic logging tool 400, the axial resolution of slowness logs can vary with different sub-array processing. Generally, the axial resolution of an extracted slowness curve is between the receiver to receiver spacing and the array size, depending on the size of the sub-array. Moreover, as operation of the logging tool may include the firing of lower monopole, far monopole, and ultra-far monopole transmitters. In cases in which an array of thirteen receivers is used, the combined firing may produce 39 wavetrains (e.g., three wavetrains received by each receiver used). In such cases, a minimum resolution of about 19 feet (about 5.5 meters) may result. In other cases, a receiver array having any number of receivers may be used. For example, when a receiver array having fifteen (15) receivers is used, the firing of lower monopole, far monopole, and ultra-far monopole transmitters may result in 45 wavetrains, or in cases in which a receiver array having 25 receivers is used, 75 wavetrains may result. While other methods may have a smooth curve, such methods sacrifice resolution and do not fully utilize the data of a large number of waveforms (e.g. the 39 waveforms described in the example above). Additionally, important information regarding near-borehole formation elastic property changes may be lost using other techniques; i.e., this technique described herein improves the technology by preserving near-borehole formation elastic property changes.

Figure 5:
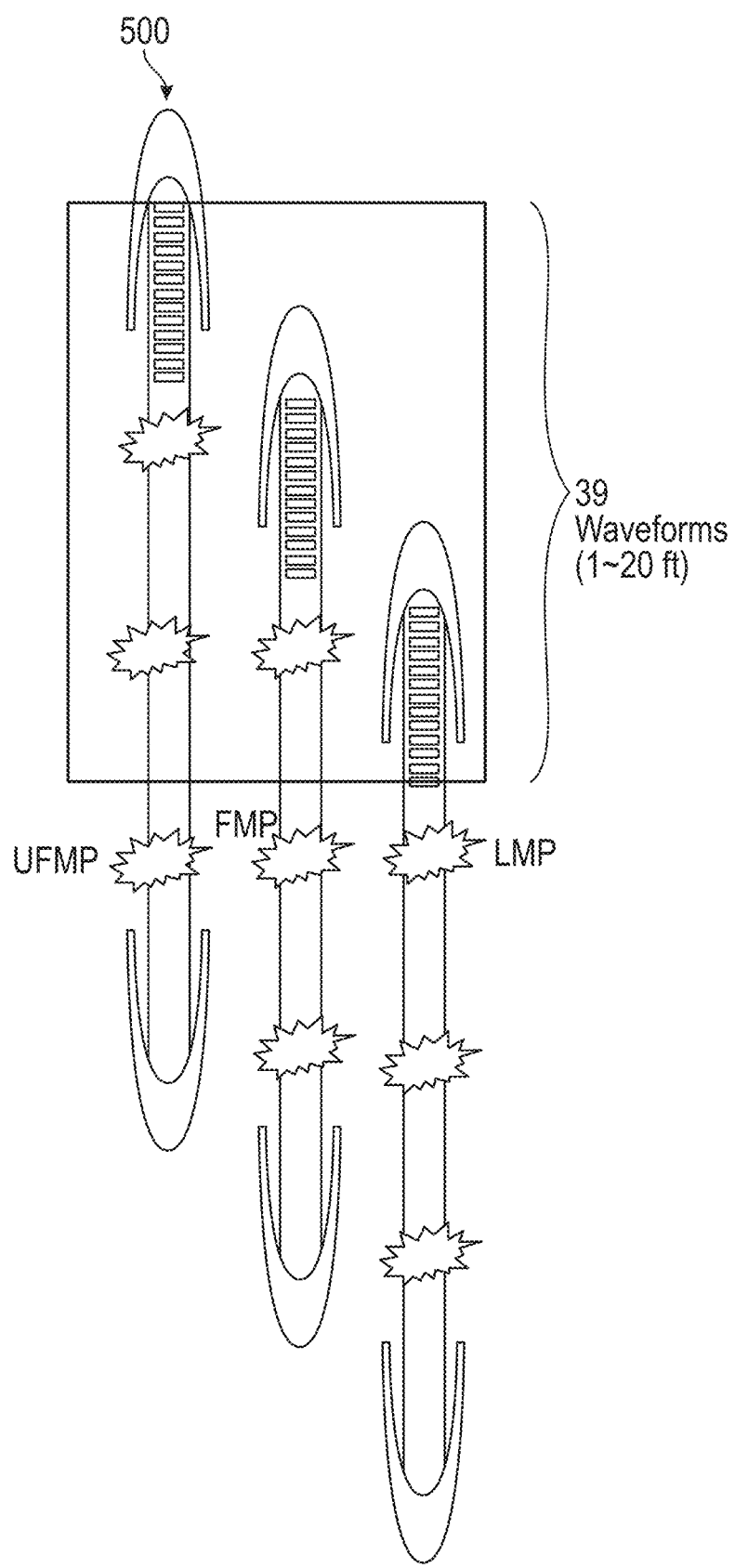
FIG. 5 illustrates a diagrammatic view of an acoustic logging tool used to collect lower monopole (LMP), far monopole (FMP), and ultrafar monopole (UFMP) data, according to an exemplary embodiment of the present disclosure.

FIG. 5 is a schematic diagram of an acoustic logging tool 500 having three transmitters and an array of a plurality of receivers (13 receivers are depicted) and depicting lower monopole (LMP), far monopole (FMP), and ultra-far monopole (UFMP) firing to form a full-offset common-transmitter array. The acoustic logging tool 500 may include any number of transmitters and receiver arrays, having any number of receivers and receiver-receiver spacings, and still be within the spirit and scope of the present disclosure. As depicted in FIG. 5, firing the transmitters of the acoustic logging tool at three different shot locations causes the array size to be three times the number of receivers in the receiver array. For example, as depicted in FIG. 5, the array size becomes 39 after the combined firing.

FIG. 6 illustrates a flowchart depicting a method 600 of enhanced-resolution sonic data processing for formation body wave slowness with full-offset waveform data, in accordance with certain exemplary embodiments of the present disclosure. The method shown in FIG. 6 is provided by way of an example, as there are a variety of ways to carry out the method. Each block shown in FIG. 6 represents one or more processes, methods, or subroutines, carried out in the exemplary method shown in FIG. 6. Furthermore, the illustrated order of blocks is illustrative only as according to the certain aspects of the present disclosure, the order of the blocks may change. Additional blocks can be added or fewer blocks can be utilized, without departing from the present disclosure.

The exemplary method 600 can begin at block 610. At block 610, a target axial resolution is selected based on the size of the receiver array. The size of the receiver array can be calculated by the following equation, $$L=\lfloor Res/RR+1 \rfloor, \quad (1)$$

where L denotes the size of the sub-array, Res represents the target resolution, and RR denotes the receiver-receiver space. At block 620, waveforms at a plurality of shot positions for a target zone are obtained. For instance, the acoustic logging tool may be raised or lowered in the borehole to different shot positions where the transmitter or transmitters are fired and the resulting acoustic signals captured by the receivers. Combining all the waveform data at the receivers at the same depth of the target zone but with different shot positions provides abundant data for evaluating the target formation.

At block 630, reconstructed sets of waveform data for the target zone is determined, with each set corresponding to a particular shot position. Each set of sub-array data is processed to determine a semblance map, a variable density log (VDL), and a slowness value for each set at block 640. At block 650, the VDLs are stacked. Slowness values from the stacked VDLs are extracted at block 660. Alternatively, the slowness values may be determined based on the average slowness values of each set of sub-array data.

FIG. 7 illustrates a diagrammatic view of acoustic logging tool 700 lowered in a wellbore to collect waveforms from a target zone at a plurality of shot positions according to a common transmitter gather, in accordance with certain exemplary embodiments of the present disclosure. As depicted in FIG. 7, the acoustic logging tool 700 may be lowered to a depth in the borehole corresponding to a target zone of interest 750 followed by causing the transmitter to fire and capturing acoustic signals at the receiver array 775. The acoustic logging tool 700 may be repositioned in the wellbore a plurality of times in order to collect waveform data at the receiver array 775 for the same target zone 750 but with different shot positions 1-33. In this manner, abundant data for evaluating the target zone of interest 750 may be collected. FIG. 7 depicts a common transmitter array shown capable of collecting a combined data set that includes LMP, FMP, and UFMP data. Alternatively, the presently disclosed processing methods may be carried out using only LMP, FMP, or UFMP data, although the amount of reconstructed sub-arrays would be different.

The transmitter array may have any axial resolution. For example, the transmitter array 775 depicted in FIG. 7 may have an axial resolution of 2.5 feet (0.762 meters). An axial resolution of 2.5 feet (0.762 meters) requires a sub-array with six receivers when RR=0.5 feet. Assuming the data is acquired at an equally spaced firing of 0.5 feet (1.524 meters) with the moving transmitter, FIG. 7 shows that data sorting at each firing covers the same target zone 750. As depicted in FIG. 7, at shot 1, waveform data at receivers 34-39 meet the sorting requirements, and for shot 2, receivers 33-38 meet the sorting requirements. In total, acoustic logging tool 700 can acquire 34×6 sets of waveforms, which greatly exceeds that used in full-array processing that uses only thirteen receiver waveforms. As depicted in FIG. 7, all sets of selected waveform data cover the same target zone 750 and have the same axial resolution, but not the same investigating depth. Consequently, it is feasible to combine the processing of all sets of waveform data together if the investigating depth issue is considered.

Method 600 works particularly well for cases in which the selected subarray sets have the same investigation depth, for instance, when the first arrivals of refracted waves always indicate the virgin formation slowness. However, when alteration is present, subarray data with small offset might reflect the slowness value of the alteration zone and inclusion of such data in the VDL stacking procedure may bias the final estimates of virgin formation slowness. Additionally, an operator may not know which sub-array reflects the slowness of the virgin formation since the operator does not know the alteration depth of the formation. Thus, for cases with near-borehole alteration, the user may find it difficult to select the dataset that could be utilized to accurately process slowness logs.

In order to overcome these challenges, and to reveal additional information about the alteration zone (slowness change and alteration depth), the present disclosure further provides method 800 depicted in FIG. 8.

FIG. 8 illustrates a flowchart depicting a method 800 for enhanced-resolution sonic data processing for formation body wave slowness with full-offset waveform data, in accordance with certain exemplary embodiments of the present disclosure. Method 800 includes model-constrained processing to obtain high-resolution formation wave slowness for both virgin formation and near borehole formation slowness. The method shown in FIG. 8 is provided by way of an example, as there are a variety of ways to carry out the method. Each block shown in FIG. 8 represents one or more processes, methods, or subroutines, carried out in the exemplary method shown in FIG. 8. Furthermore, the illustrated order of blocks is illustrative only as according to the certain aspects of the present disclosure, the order of the blocks may change. Additional blocks can be added or fewer blocks can be utilized, without departing from the present disclosure.

The exemplary method 800 can begin at block 805. At block 805, a target axial resolution is selected based on the size of the receiver array and target zone. At block 810, waveforms are obtained at a plurality of shot positions for a target zone. At block 815, all of the sets of waveform data corresponding to the target zone, including LMP, FMP, and UFMP waveform data, are reconstructed to generate a plurality of subarray datasets corresponding to the target zone. A slowness value for each sub-array dataset corresponding to the target formation is determined at block 820. At block 825, the slowness versus offset for each sub-array is determined. For instance, taking the offset of the middle point of the receiver array as the reference offset for each subarray, and connecting the slowness value for each sub-array to the offset, a measurement of slowness versus offset may be determined. This measurement contains important information on formation slowness and alteration depth.

At block 830, a simplified borehole model with near-borehole alteration may be built. A simplified slowness versus offset model may be built based on the simplified borehole model, at block 835. The simplified slowness versus offset model may, for example, be a simplified mathematical model describing the relationship between the slowness and the offset for target waves. The mathematical model may be an empirical equation, or might be generated from forward modeling. At block 840, the parameters in the simplified borehole model are optimized by minimizing the misfit between the measured slowness values and the borehole model and the slowness versus offset model. For instance, an inversion may be performed to decrease the misfit between the modeling and the measurement to generate optimized parameters. The virgin formation slowness may be extracted from the optimized simplified slowness versus offset model based on the slowness with the longest offset predicted by the model, at block 845. At block 850, alteration zone slowness may be extracted from the optimized simplified slowness versus offset model based on the slowness with the shortest offset. Because the waves at the receiver with the shortest offset are not well separated in the time domain, the slowness of the target waves might be biased by influences from other modes. Therefore, a short-offset slowness correction might be performed on the alteration zone slowness to gain better accuracy. At box 855, the alteration radial depth (AD) is determined from the offset value at which the optimized simplified slowness equals to the average of the alteration zone slowness and the virgin formation slowness. This reference offset refers to the position where the alteration zone waves and virgin formation waves simultaneously arrive. In at least some instances, this reference offset vs. AD curve might be calculated with a ray-model, the alteration depth can then be calculated from the estimated reference offset of the optimized simplified slowness versus offset model with the reference offset vs. AD curve.

Figure 9:
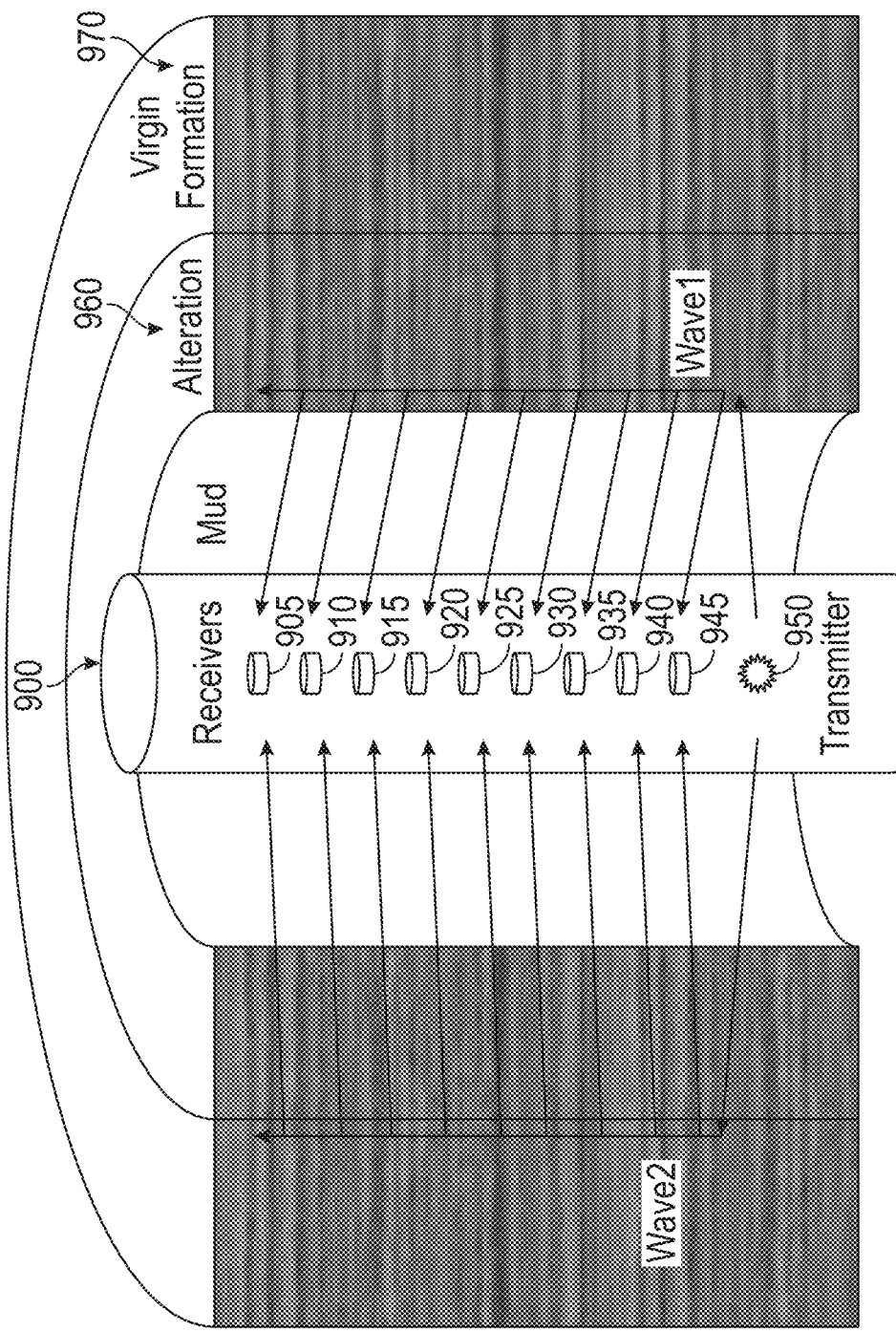
FIG. 9 illustrates a diagrammatic view of a simplified borehole model with alteration, according to an exemplary embodiment of the present disclosure.

FIG. 9 depicts a simplified borehole model having an alteration zone, such as the simplified borehole model with near-borehole alteration described in method 800 of FIG. 8. The simplified borehole model depicted in FIG. 9 includes acoustic logging tool 900 having at least one transmitter 950 capable of exciting acoustic signals of different azimuthal orders. Acoustic logging tool 900 further includes a large-span receiver array comprising a plurality of receivers (nine receivers 905-945 are depicted). While acoustic logging tool 900 is shown having a single transmitter 950 and nine receivers 905-945, the simplified borehole model may include an acoustic logging tool having any number of transmitters and receivers. In at least some instances, the simplified borehole model depicted in FIG. 9 may be used to generate synthetic waves. As depicted in FIG. 9, the simplified borehole model incudes alteration zone 960 and virgin formation 970. Alteration zone 960 exists uniformly around the borehole and therefore has an equal alteration depth (AD). The simplified borehole model may include an alteration zone having any configuration. There may be two types of refract compressional waves in the borehole—one wave type comprises the waves along the borehole side wall (Wave 1) having the speed of alteration zone waves and the other wave type comprises the waves along the interface between the alteration zone and the virgin formation (Wave 2) having the velocity of the virgin formation.

Figure 10:
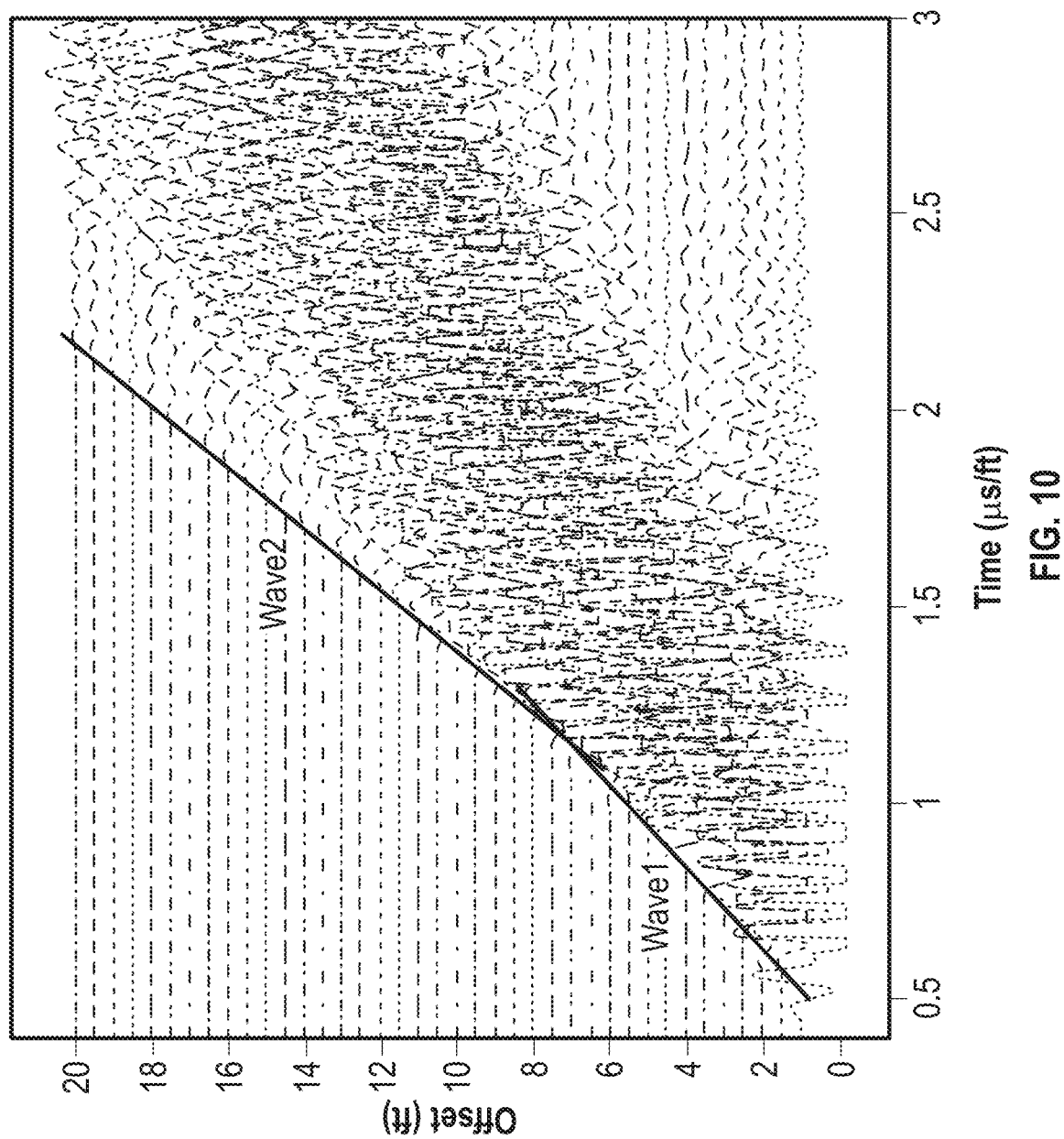
FIG. 10 illustrates synthetic waveform data for the simplified borehole model depicted in FIG. 9, according to an exemplary embodiment of the present disclosure.

FIG. 10 depicts waveforms for the simplified borehole model depicted in FIG. 9, where the virgin formation compressional slowness (DTC) is 76.2 µs/ft, the alteration zone DTC is 101.6 µs/ft and the alteration depth (AD) is 40 cm (1.31 ft). The first arrivals of the waves show a competition between the refracted compressional waves from alteration zone (Wave 1) and the virgin formation (Wave 2). Note that for short-offset waves, waves from the alteration zones form the first arrivals, while for long-offset waves, waves from the virgin formation are the first arrivals. In between the long and short offset, the first arrival gently changes from Wave 1 to Wave 2. Further, if one processes this first arrival of adjacent subarray data, it is expected that the slowness also gently changes from the alteration zone slowness to the virgin formation slowness, which is the theoretical basis of the presently disclosed method.

The data presented in FIG. 10 might be reconstructed to be a 34*6 array having 34 subarray sets where each subarray includes six waveforms. The offset of the middle point of each receiver array is taken as the reference offset of the processing. A monopole processing that captures the first arrival as DTC may be utilized to get the slowness at the first arrival of target waves. Any suitable method capable of obtaining both the VDL and slowness for the first arrival of target modes may be utilized. For example, the monopole array waveforms may be obtained by downhole sensors and a first motion detection and track method can be applied to locate the first arrival in the waveforms, which is always the P-wave. If the first arrival is well determined, a narrow 2-D semblance time window that spans the first arriving P-wave energy can be adopted. The semblance method is not critically important and can include point-to-point methods like stacking or DPTS within that narrow 2-D window or time-window based methods like STC or N-th root. These methods effectively average slowness over a narrow time window, which implicitly limits the slowness accuracy of time semblance methods. This narrow time window provides a higher quality P-slowness estimation, as the first arriving P-waves are less affected by the reflected and scattered waves.

If the first motion detection technique fails to detect the first arrival, the known slowness at neighboring depths toward the transmitter may be used to compute and predict the travel time of P-waves if the acoustic tool is in an up logging mode. The obtained travel time of P-waves provides a reliable starting time window for the semblance calculation. However, if the algorithm fails to provide a Travel Time (TT), a time window for the coherence processing can be used. The coherence map in either case will be projected to the slowness axis, resulting in a 1-D coherence Variable Density Log (VDL). A 1D slowness labeling and tracking algorithm can then be used to pick the P-slowness from the 1D slowness coherence map. The P-slowness will be output as the final answer from the picking algorithm.

Although most first motion detection methods can be used to locate the first motion in the waveforms, it is preferable to use a back/front time window amplitude ratio method to detect the first motion along each wave train. In this method, a band-pass filter is applied to the waveforms to remove the high-frequency and low-frequency noise. Next, in order to remove the influence of the signal phase, the instantaneous amplitude information of the waveforms is obtained by using Hilbert transforms. Subsequently, the instantaneous amplitude is normalized and clipped by an adaptive threshold method with an estimation of the SNR of the waveforms to prevent the arrival time automation from jumping occasionally to later arrivals. The ratio of the two amplitude averages within the front and back window associated with the reference time T is then computed, and the front/back window is moved to obtain a ratio curve against the reference time T. The arrival time of P-waves can be estimated either by tracking the maximum in the ratio curve with previous results or using the user input parameters.

If the first motion detection method fails to provide the arrival time of refracted P-waves, it is possible to compute the P arrival time by integrating compressional slowness and traveling distances of the formations between the transmitter and receiver if the acoustic tool is in up logging mode.

In order to generate a 1D coherence VDL map, the waveforms are truncated after band-pass filtering the signal with the arrival time generated by the first motion detection program. Next, in order to refine the slowness computation gridding step in the coherence calculation process, the waveforms data are interpolated to have a smaller time sampling interval. In a preferred embodiment, the waveforms themselves are not directly interpolated, but instead interpolation is used when computing the 2-D semblance calculations as this is computationally more efficient and yields the same accuracy. Finally, the coherence map versus P-slowness is calculated and passed on to the slowness track and pick process.

Figure 11:
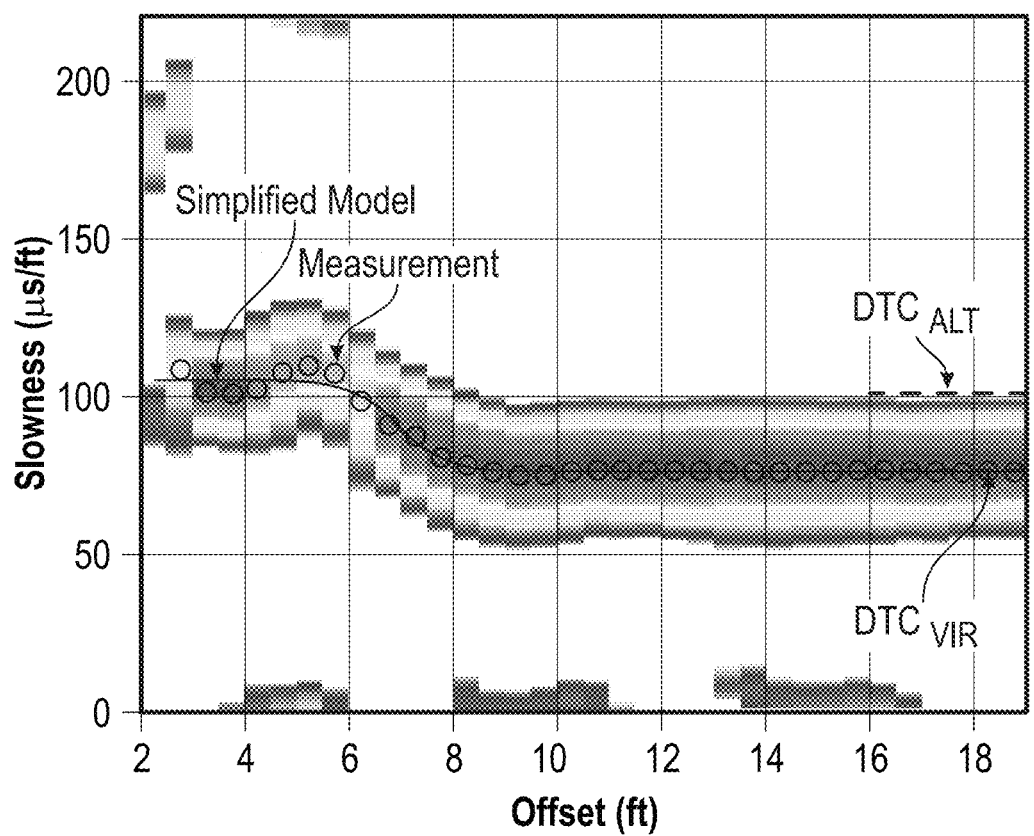
FIG. 11 illustrates a slowness-offset curve overlaying variable density log (VDL) maps, according to an exemplary embodiment of the present disclosure.

The data presented in FIG. 10 are processed according to the presently disclosed methods. FIG. 11 depicts the VDL map overlaid with estimated slowness (circles) for sub-arrays with different offsets. DTC for alteration zone (DTC$_{ALT}$) and DTC for virgin formation (DTC$_{VIR}$) are plotted for comparison. Note that the circles approach DTC$_{VIR}$ when offset goes high, and they approach DTC$_{ALT}$ for short offsets.

At the same time, a slowness-offset model for the borehole model is generated. The slowness-offset model might be calculated from forward modeling assuming a borehole model, as shown in FIG. 9. Alternatively, a model with an empirical equation to describe the relationship between slowness and offset may be used, for example, $$s(s_{VIR}, \Delta s, o, o'a) = s_{VIR} + \Delta s \frac{1 - \tanh[(o - o')a]}{2}, \quad (2)$$

Where o represents the offset of the subarray; o' represents the offset where virgin formation waves have the same arrival time with the alteration zone waves, and start to become the first arrival of the wavetrain; a is a parameter describing the changing rate from alteration zone slowness to virgin formation slowness, which is related to both the array size and alteration transition zone thickness; S$_{VIR}$ is the virgin formation body wave slowness; and Δs is the difference between the virgin formation body wave slowness and the invasion zone wave slowness. Thus, the alteration zone slowness is, $$S_{ALT} = S_{VIR} + \Delta s \quad (3)$$

Equation 2 uses a hyperbolic tangent function to describe the phenomenon that the slowness changes from the alteration zone slowness to the virgin formation slowness. As shown below, this simplified model has suitable accuracy. Equation 2 may be replaced by any similar slowness-offset model. Additionally, a look-up table may be generated using forward modeling and used to replace Equation 2.

Subsequently, an inversion algorithm is performed to extract the parameters in Equation 2, $$\min\left\{\sum_O |s(s_{VIR}, \Delta s, o, o', a) - s_{meas}|^2\right\}, \quad (4)$$

and the parameters that minimize the misfit between the simplified model S(S$_{VIR}$,Δs,o',a) and the measurement S$_{meas}$ are extracted. The inverted S$_{VIR}$ is 76.2 μs/ft, which is equal to input virgin formation DTC. The inverted o' is 6.93 ft and a=1.12. o' might be utilized in calculating AD in the final procedure. Δs is 29.3 μs/ft, and S$_{ALT}$ is 105.5 μs/ft, which is a little bit higher than input alteration zone slowness. This is because the waves with short offset are not well separated in time-domain, the slowness might be biased a little bit by the contamination from non-target modes. In order to remove the short-offset influence, an exactly modeling based correction might be performed to account for the error. Alternatively, a look-up table may be generated that includes the optimized correction amounts for the different situation by forward modeling; the final slowness may be outputted after the correction.

FIG. 11 shows the final estimates for the slowness-offset model in the form of a slowness-offset solid curve, overlaying on the VDL maps and the slowness-offset measurements. The slowness-offset curve matches well the features of the slowness-offset measurements. Good agreement is observed. Accordingly, the results depicted in FIG. 11 suggest that the simplified model is accurate and suitable for processing.

The fluctuating of slowness values with short offsets was also observed, which is due to the short-offset effects that the contamination of non-target waves might bias the slowness values.

Figure 12:
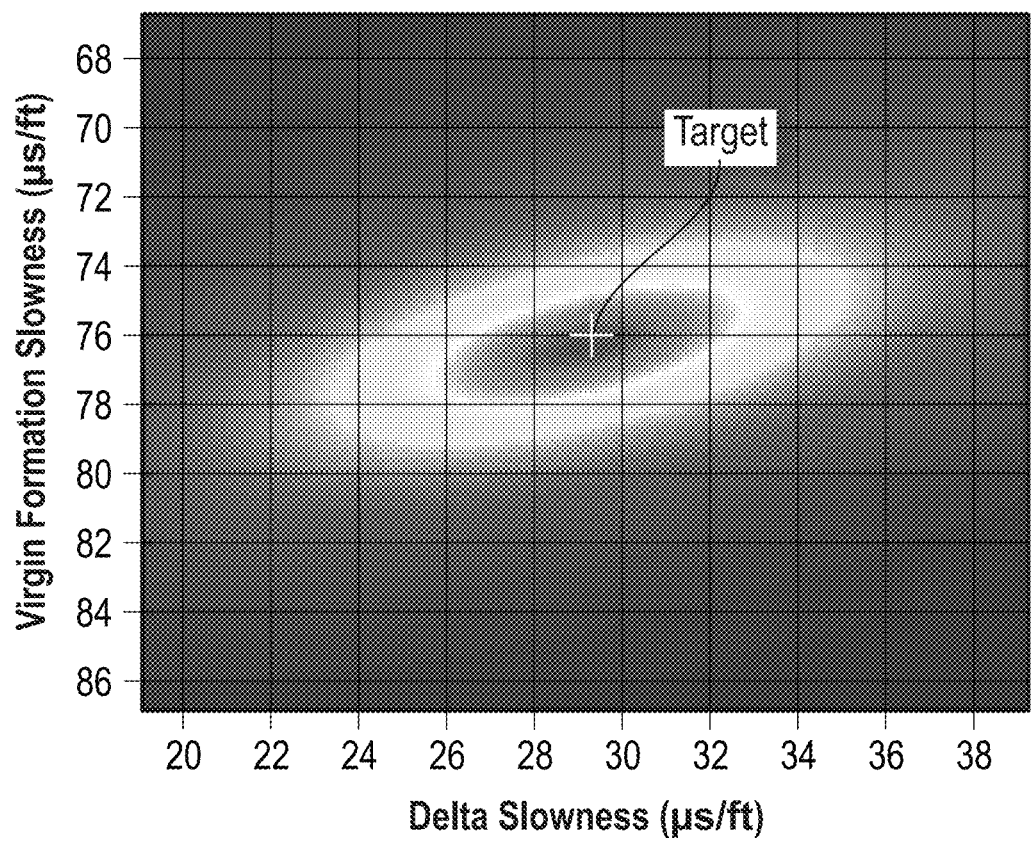
FIG. 12 illustrates a misfit function map, according to an exemplary embodiment of the present disclosure.

FIG. 12 shows a misfit calculation using Equation 4 for different S$_{VIR}$ and Δs with the optimized o and a. Note that the misfit surface is smooth and the optimal solution is unique and clear, suggesting that the equation is well-conditioned.

Figure 13:
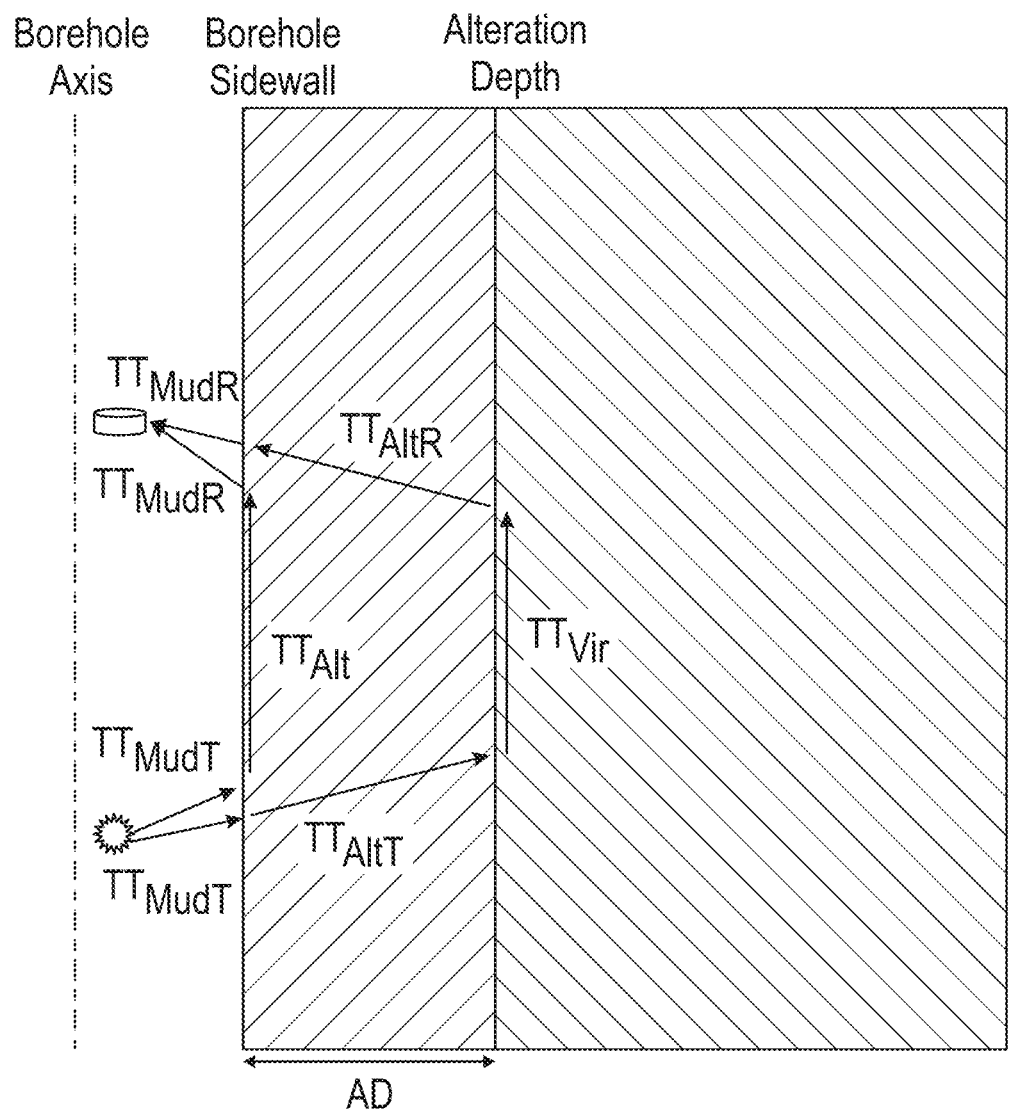
FIG. 13 illustrates a ray-model for a borehole model with alteration, according to an exemplary embodiment of the present disclosure.

As depicted in FIGS. 11 and 12, the slowness for virgin formation and alteration zone is estimated. Subsequently, the alteration depth (AD) may be calculated from the optimized parameters $S_{VIR}$, $\Delta s$ and $o$ by applying a ray-model. For example, with $S_{VIR}$ and $\Delta s$, a 2-D model may be constructed as shown in FIG. 13. The ray paths for the alteration zone waves and the virgin formation waves can be easily predicted by the ray theory, and the travel times for different waves may be calculated. For example, for the alteration zone waves, $$TT_{Wave1}=TT_{mudT}+TT_{Alt}+TT_{mudR}, \quad (5)$$

Where TT is the overall travel time, $TT_{mudT}$ is the time delay from transmitter to the borehole sidewall, $TT_{Alt}$ is the travel time along the borehole sidewall in the alteration zone, $TT_{mudR}$ is the time delay from the borehole sidewall to the receiver.

$$TT_{mudT} = \frac{(R_{BH} - R_T)s_{mud}}{\cos\left[\arcsin\left(\frac{S_{ALT}}{S_{mud}}\right)\right]}, \quad (6)$$

$$TT_{Alt} = \left\{ o - [(R_{BH} - R_T) + (R_{BH} - R_R)]\tan\left[\arcsin\left(\frac{S_{ALT}}{S_{mud}}\right)\right] \right\} s_{ALT}, \quad (7)$$

$$TT_{mudR} = \frac{(R_{BH} - R_R)s_{mud}}{\cos\left[\arcsin\left(\frac{S_{ALT}}{S_{mud}}\right)\right]}, \quad (8)$$

Where $R_{BH}$, $R_T$, and $R_R$ are borehole radius, transmitter radius, and the receiver radius; S mud is mud slowness, $S_{ALT}$ is the alteration zone slowness of target waves.

For the virgin formation waves, the overall travel-time is, $$TT_{Wave2}=TT_{mudT}+TT_{AltT}+TT_{VIR}+TT_{AltR}+TT_{mudR}, \quad (9)$$

Where TT is the overall travel time, $TT_{mudT}$ is the time delay from transmitter to the borehole sidewall, $TT_{AltT}$ is the time delay from borehole sidewall to the virgin formation, $TT_{VIR}$ is the travel time along the interface between borehole alteration zone and the virgin formation, $TT_{AltR}$ is the time delay from the virgin formation to the borehole sidewall, $TT_{mudR}$ is the time delay from the borehole sidewall to the receiver. They are calculated with the following equations predicted by ray-theory, $$TT_{mudT} = \frac{(R_{BH} - R_T)s_{mud}}{\cos\left[\arcsin\left(\frac{S_{VIR}}{S_{mud}}\right)\right]}, \quad (10)$$

$$TT_{AltT} = \frac{ADs_{ALT}}{\cos\left[\arcsin\left(\frac{S_{VIR}}{S_{ALT}}\right)\right]}, \quad (11)$$

$$TT_{VIR} = \left\{ o - [(R_{BH} - R_T) + (R_{BH} - R_R)]\tan\left[\arcsin\left(\frac{S_{VIR}}{S_{mud}}\right)\right] - 2AD\tan\left[\arcsin\left(\frac{S_{VIR}}{S_{ALT}}\right)\right] \right\} s_{VIR}, \quad (12)$$

$$TT_{AltR} = \frac{ADs_{ALT}}{\cos\left[\arcsin\left(\frac{S_{VIR}}{S_{ALT}}\right)\right]}, \quad (13)$$

$$TT_{mudR} = \frac{(R_{BH} - R_R)s_{mud}}{\cos\left[\arcsin\left(\frac{S_{VIR}}{S_{mud}}\right)\right]}. \quad (14)$$

Figure 14:
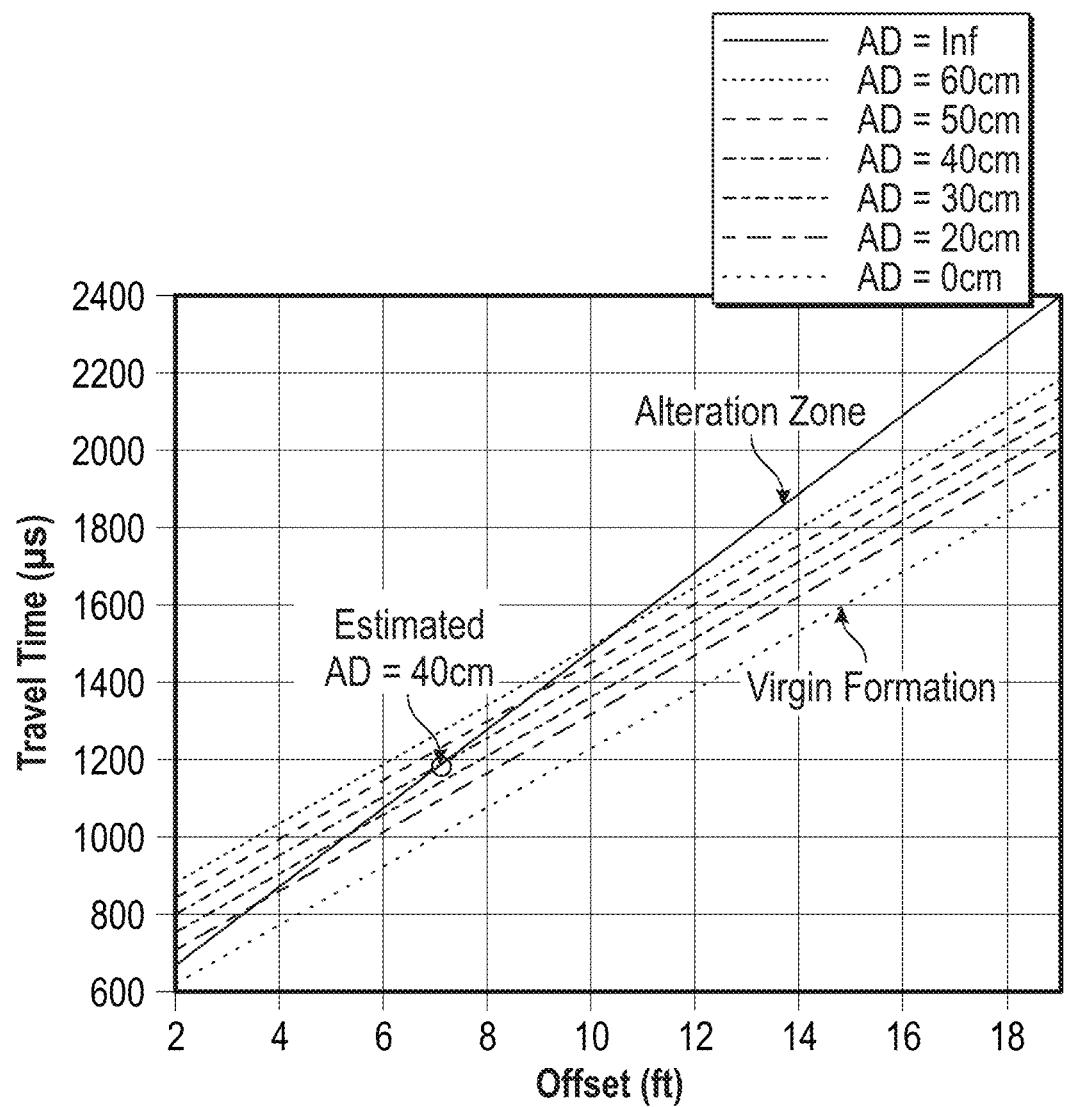
FIG. 14 illustrates a chart depicting predictions of travel times with different alteration depths for a simplified borehole model.

FIG. 14 shows the predictions of travel times with different AD for the model in FIGs by a Ray-model. 11 and 12 with Equations 5-14, where the AD of 0 cm represents a non-alteration and AD of infinite, representing a homogenous formation with the alteration zone property. The displays of the arrival time show the competition of the alteration zone waves and the virgin formation waves to be the first arrivals. More specifically, the offset point, where virgin formation waves start to replace alteration-zone waves and become the first arrival, i.e. O' in equation 2, is directly related to the alteration zone depth. As shown in FIG. 14, as the AD increases, the offset O' monotonously increases, thus the AD vs. O' curve might be calculated. For example, the calculated offset O' in FIGS. 11-12 is 6.93 ft, and it corresponds to an AD of 40 cm (1.31 ft) in FIG. 14. Therefore, the estimated AD from the processing is 40 cm, which agrees very well with the model input value of 40.2 cm.

Numerous examples are provided herein to enhance understanding of the present disclosure. A specific set of statements are provided as follows.

Statement 1: A method of determining body wave slowness values for a target formation zone, the method comprising: selecting a target axial resolution based on the size of a receiver array; obtaining a plurality of waveform data sets corresponding to a target formation zone, wherein each waveform data set is acquired at a different shot position; reconstructing the plurality of waveform data sets to generate a plurality of subarray data sets corresponding to the target formation zone; determining a slowness value for each subarray data set; determining a slowness versus offset value for each subarray data set; generating a borehole model having an alteration formation zone and a virgin formation zone; generating a slowness versus offset model based at least in part on the borehole model; optimizing the parameters in the borehole model by minimizing the misfit between the slowness value for each subarray data set and the borehole model and the slowness versus offset model to generate an optimized borehole model and an optimized slowness versus offset model; extracting a virgin formation zone slowness from the optimized slowness versus offset model based on the slowness with the longest offset predicted by the model; and extracting an alteration formation zone slowness from the optimized slowness versus offset model based on the slowness with the shortest offset predicted by the model.

Statement 2: A method according to Statement 1, further comprising: determining the radial depth of the alteration formation zone based on the optimized slowness versus offset model.

Statement 3: A method according to Statement 2, wherein determining the radial depth of the alteration formation zone based on the optimized slowness versus offset model comprises calculating the radial depth of the alteration formation zone using a ray-model.

Statement 4: A method according to any one of the preceding Statements 1-3, wherein the plurality of waveform data sets comprises lower monopole (LMP), far monopole (FMP), and ultrafar monopole (UFMP) data.

Statement 5: A method according to any one of the preceding Statements 1-4, wherein the slowness versus offset model is generated using forward modeling.

Statement 6: A method according to any one of the preceding Statements 1-5, wherein generating a slowness versus offset model comprises generating a look-up table comprising slowness values and related offset values.

Statement 7: A method according to Statement 6, wherein the look-up table is generated using forward modeling.

Statement 8: A method according to any one of the preceding Statements 1-7, wherein optimizing the parameters in the borehole model comprises generating, using forward modeling, a look-up table that includes optimized slowness versus offset values.

Statement 9: A method of determining body wave slowness values for a target formation zone, the method comprising: selecting a target axial resolution based on the size of the receiver array; obtaining a plurality of waveform data sets corresponding to a target formation zone, wherein each waveform data set is acquired at a different shot position; determining reconstructed sets of waveform data for the target formation zone, wherein each reconstructed set of waveform data corresponds to a particular shot position; determining a semblance map, a variable density log (VDL), and a slowness value for each reconstructed set of waveform data; stacking the VDLs; and extracting body wave slowness values from the stacked VDLs.

Statement 10: A method according to Statement 9, wherein the plurality of waveform data sets comprises lower monopole (LMP), far monopole (FMP), and ultrafar monopole (UFMP) data.

Statement 11: An apparatus comprising: an acoustic logging tool having a receiver array, the acoustic logging tool configured to acquire a plurality of waveform data sets corresponding to a target formation zone, wherein each waveform data set is acquired at a different shot position; at least one processor in communication with the acoustic logging tool, wherein the processor is coupled with a non-transitory computer-readable storage medium having stored therein instructions which, when executed by the at least one processor, causes the at least one processor to: select a target axial resolution based on the size of a receiver array; obtain a plurality of waveform data sets corresponding to a target formation zone, wherein each waveform data set is acquired at a different shot position; reconstruct the plurality of waveform data sets to generate a plurality of subarray data sets corresponding to the target formation zone; determine a slowness value for each subarray data set; determine a slowness versus offset value for each sub array data set; generate a borehole model having an alteration formation zone and a virgin formation zone; generate a slowness versus offset model based at least in part on the borehole model; optimize the parameters in the borehole model by minimizing the misfit between the slowness value for each subarray data set and the borehole model and the slowness versus offset model to generate an optimized borehole model and an optimized slowness versus offset model; extract a virgin formation zone slowness from the optimized slowness versus offset model based on the slowness with the longest offset predicted by the model; and extract an alteration formation zone slowness from the optimized slowness versus offset model based on the slowness with the shortest offset predicted by the model.

Statement 12: An apparatus according to Statement 11, wherein the non-transitory computer-readable storage medium further contains a set of instructions that when executed by the at least one processor, further causes the at least one processor to: determine the radial depth of the alteration formation zone based on the optimized slowness versus offset model.

Statement 13: An apparatus according to Statement 12, wherein determine the radial depth of the alteration formation zone based on the optimized slowness versus offset model comprises calculating the radial depth of the alteration formation zone using a ray-model.

Statement 14: An apparatus according to any one of the preceding Statements 11-13, wherein the plurality of waveform data sets comprises lower monopole (LMP), far monopole (FMP), and ultrafar monopole (UFMP) data.

Statement 15: An apparatus according to any one of the preceding Statements 11-14, wherein the acoustic logging tool is configured to acquire lower monopole (LMP), far monopole (FMP), and ultrafar monopole (UFMP) data.

Statement 16: An apparatus according to any one of the preceding Statements 11-15, wherein generate a slowness versus offset model comprises generating a look-up table comprising slowness values and related offset values.

Statement 17: An apparatus according to any one of the preceding Statements 11-16, wherein optimize the parameters in the borehole model comprises generating, using forward modeling, a look-up table that includes optimized slowness versus offset values.

Statement 18: A system comprising: an acoustic logging tool disposed within a wellbore, the acoustic logging tool having a receiver array and configured to acquire a plurality of waveform data sets corresponding to a target formation zone, wherein each waveform data set is acquired at a different shot position; at least one processor in communication with the acoustic logging tool, wherein the processor is coupled with a non-transitory computer-readable storage medium having stored therein instructions which, when executed by the at least one processor, causes the at least one processor to: select a target axial resolution based on the size of a receiver array; obtain a plurality of waveform data sets corresponding to a target formation zone, wherein each waveform data set is acquired at a different shot position; reconstruct the plurality of waveform data sets to generate a plurality of subarray data sets corresponding to the target formation zone; determine a slowness value for each subarray data set; determine a slowness versus offset value for each subarray data set; generate a borehole model having an alteration formation zone and a virgin formation zone; generate a slowness versus offset model based at least in part on the borehole model; optimize the parameters in the borehole model by minimizing the misfit between the slowness value for each subarray data set and the borehole model and the slowness versus offset model to generate an optimized borehole model and an optimized slowness versus offset model; extract a virgin formation zone slowness from the optimized slowness versus offset model based on the slowness with the longest offset predicted by the model; and extract an alteration formation zone slowness from the optimized slowness versus offset model based on the slowness with the shortest offset predicted by the model.

Statement 19: A system according to Statement 18, wherein the non-transitory computer-readable storage medium further contains a set of instructions that when executed by the at least one processor, further causes the at least one processor to: determine the radial depth of the alteration formation zone based on the optimized slowness versus offset model using a ray model.

Statement 20: A system according to Statement 19, wherein the acoustic logging tool is configured to acquire lower monopole (LMP), far monopole (FMP), and ultrafar monopole (UFMP) data, and wherein the plurality of waveform data sets comprises lower monopole (LMP), far monopole (FMP), and ultrafar monopole (UFMP) data.

Statement 21: A system according to any one of the preceding Statements 18-20, wherein the non-transitory computer-readable storage medium further contains a set of instructions that when executed by the at least one processor, further causes the at least one processor to: generate a visualization of at least one of the virgin formation slowness, alteration formation zone slowness, and radial depth of the alteration formation zone.

Statement 22: An apparatus according to any one of the preceding Statements 11-17, wherein the non-transitory computer-readable storage medium further contains a set of instructions that when executed by the at least one processor, further causes the at least one processor to: generate a visualization of at least one of the virgin formation slowness, alteration formation zone slowness, and radial depth of the alteration formation zone.

Statement 23: A method according to Statement 9 or Statement 10, further comprising generating a visualization of at least one of the semblance map, variable density log (VDL), slowness value, and body wave slowness.

Statement 24: A method according to any one of the preceding Statements 1-9, further comprising generating a visualization of at least one of the virgin formation slowness, alteration formation zone slowness, and radial depth of the alteration formation zone.

Statement 25: A method according to any one of the preceding Statements 1-9 and Statement 24, further comprising adjusting at least one downhole operational parameter based at least in part on at least one of the virgin formation slowness, alteration formation zone slowness, and radial depth of the alteration formation zone.

Statement 26: A method according to Statement 25, wherein the operational parameter is selected from the group consisting of a drilling parameter, a logging parameter, a completion parameter, a production parameter, and any combination thereof.

Statement 27: A method according to any one of the preceding Statements 9-10 and 23, further comprising adjusting at least one downhole operational parameter based at least in part on at least one of the semblance map, variable density log (VDL), slowness value, and body wave slowness.

Statement 28: A method according to Statement 27, wherein the operational parameter is selected from the group consisting of a drilling parameter, a logging parameter, a completion parameter, a production parameter, and any combination thereof.

Statement 29: A system according to any one of the preceding Statements 18-21, wherein the at least one processor is disposed within the wellbore.

Statement 30: A system according to any one of the preceding Statements 18-21, wherein the at least one processor is not disposed within the wellbore.

Statement 31: A system according to any one of the preceding Statements 18-21, wherein the at least one processor comprises a plurality of processors, at least one of the plurality of processors disposed within the wellbore and at least one of the plurality of processors not disposed within the wellbore.

Statement 32: An apparatus according to any one of the preceding Statements 11-17 and 22, wherein the at least one processor is disposed in the acoustic logging tool.

Statement 33: A method according to any one of the preceding Statements 1-10 and 23-28, further comprising disposing an acoustic logging tool in a wellbore, the acoustic logging tool comprising one or more transmitters and a receiver array; and actuating the one or more transmitters so as to obtain a plurality of waveform data sets corresponding to the target formation zone.

Statement 34: A method according to Statement 33, further comprising running the acoustic logging tool to a plurality of shot positions in the wellbore; and actuating the one or more transmitters at each of the plurality of shot positions so as to obtain a plurality of waveform data sets at the receiver array corresponding to the target formation zone, wherein each waveform data set is acquired at a different shot position.

We claim:
1. A method of determining body wave slowness values for a target formation zone, the method comprising:
    selecting a target axial resolution based on the size of a receiver array;
    obtaining, by an acoustic logging tool having the receiver array, a plurality of waveform data sets corresponding to a target formation zone, wherein each waveform data set is acquired at a different shot position;
    reconstructing the plurality of waveform data sets to generate a plurality of subarray data sets corresponding to the target formation zone;
    determining a slowness value for each subarray data set;
    determining a slowness versus offset value for each subarray data set;
    generating a borehole model having at least one alteration formation zone and a virgin formation zone;
    generating a slowness versus offset model based at least in part on the borehole model;
    optimizing the parameters in the borehole model by minimizing a misfit between the slowness value for each subarray data set and the borehole model and the slowness versus offset model to generate an optimized borehole model and an optimized slowness versus offset model;
    extracting a virgin formation zone slowness from the optimized slowness versus offset model based on the slowness with the longest offset predicted by the model; and
    extracting an alteration formation zone slowness from the optimized slowness versus offset model based on the slowness with the shortest offset predicted by the model.

2. The method of claim 1, further comprising determining the radial depth of the at least one alteration formation zone based on the optimized slowness versus offset model.

3. The method of claim 2, wherein determining the radial depth of the at least one alteration formation zone based on the optimized slowness versus offset model comprises calculating the radial depth of the at least one alteration formation zone using a ray-model.

4. The method of claim 1, wherein the plurality of waveform data sets comprises lower monopole (LMP), far monopole (FMP), and ultrafar monopole (UFMP) data.

5. The method of claim 1, wherein the slowness versus offset model is generated using forward modeling.

6. The method of claim 1, wherein generating a slowness versus offset model comprises generating a look-up table comprising slowness values and related offset values.

7. The method of claim 6, wherein the look-up table is generated using forward modeling.

8. The method of claim 1, wherein optimizing the parameters in the borehole model comprises generating, using forward modeling, a look-up table that includes optimized slowness versus offset values.

9. The method of claim 1, further comprising:
    running the acoustic logging tool to a plurality of shot positions in the wellbore; and
    actuating the one or more transmitters at each of the plurality of shot positions so as to obtain a plurality of waveform data sets at the receiver array corresponding to the target formation zone, wherein each waveform data set is acquired at the different shot position.

10. A method of determining body wave slowness values for a target formation zone, the method comprising:
    selecting a target axial resolution based on the size of the receiver array;

obtaining, by an acoustic logging tool having a receiver array, a plurality of waveform data sets corresponding to a target formation zone, wherein each waveform data set is acquired at a different shot position of a plurality of shot positions and each waveform data set comprises lower monopole (LMP), far monopole (FMP), and ultrafar monopole (UFMP) data gathered at each shot position of the plurality of shot positions;

determining reconstructed sets of waveform data for the target formation zone, wherein each reconstructed set of waveform data corresponds to a particular shot position;

determining a semblance map, a variable density log (VDL), and a slowness value for each reconstructed set of waveform data;

stacking the VDLs; and extracting body wave slowness values from the stacked VDLs.

11. The method of claim 10, further comprising:

running the acoustic logging tool to the plurality of shot positions in the wellbore, the acoustic logging tool comprising one or more transmitters and the receiver array; and actuating the one or more transmitters at each of the plurality of shot positions so as to obtain a plurality of waveform data sets at the receiver array corresponding to the target formation zone, wherein each waveform data set is acquired at a different shot position.

12. An apparatus comprising:

an acoustic logging tool having a receiver array, the acoustic logging tool configured to acquire a plurality of waveform data sets corresponding to a target formation zone, wherein each waveform data set is acquired at a different shot position;

at least one processor in communication with the acoustic logging tool, wherein the processor is coupled with a non-transitory computer-readable storage medium having stored therein instructions which, when executed by the at least one processor, causes the at least one processor to:

select a target axial resolution based on the size of a receiver array;

obtain a plurality of waveform data sets corresponding to a target formation zone, wherein each waveform data set is acquired at a different shot position;

reconstruct the plurality of waveform data sets to generate a plurality of subarray data sets corresponding to the target formation zone;

determine a slowness value for each subarray data set;

determine a slowness versus offset value for each subarray data set;

generate a borehole model having at least one alteration formation zone and a virgin formation zone;

generate a slowness versus offset model based at least in part on the borehole model;

optimize the parameters in the borehole model by minimizing the misfit between the slowness value for each subarray data set and the borehole model and the slowness versus offset model to generate an optimized borehole model and an optimized slowness versus offset model;

extract a virgin formation zone slowness from the optimized slowness versus offset model based on the slowness with the longest offset predicted by the model; and extract an alteration formation zone slowness from the optimized slowness versus offset model based on the slowness with the shortest offset predicted by the model.

13. The apparatus of claim 12, wherein the non-transitory computer-readable storage medium further contains a set of instructions that when executed by the at least one processor, further causes the at least one processor to determine the radial depth of the at least one alteration formation zone based on the optimized slowness versus offset model.

14. The apparatus of claim 13, wherein determining the radial depth of the at least one alteration formation zone based on the optimized slowness versus offset model comprises calculating the radial depth of the at least one alteration formation zone using a ray-model.

15. The apparatus of claim 12, wherein the plurality of waveform data sets comprises lower monopole (LMP), far monopole (FMP), and ultrafar monopole (UFMP) data.

16. The apparatus of claim 12, wherein the acoustic logging tool is configured to acquire lower monopole (LMP), far monopole (FMP), and ultrafar monopole (UFMP) data.

17. The apparatus of claim 12, wherein generating a slowness versus offset model comprises generating a look-up table comprising slowness values and related offset values.

18. The apparatus of claim 12, wherein optimizing the parameters in the borehole model comprises generating, using forward modeling, a look-up table that includes optimized slowness versus offset values.

* * * * *